(12) United States Patent
Ota et al.

(10) Patent No.: US 11,432,558 B2
(45) Date of Patent: *Sep. 6, 2022

(54) INTEGRATED HEATING AND COOLING FOOD PROCESSING SYSTEM

(71) Applicant: HAKUBAI Co., Ltd., Kurashiki (JP)

(72) Inventors: Ikuo Ota, Kurashiki (JP); Yoshiyuki Ota, Kurashiki (JP)

(73) Assignee: HAKUBAI Co., Ltd., Okayama (JP)

( * ) Notice: Subject to any disclaimer, the term of this patent is extended or adjusted under 35 U.S.C. 154(b) by 228 days.

This patent is subject to a terminal disclaimer.

(21) Appl. No.: 16/716,490

(22) Filed: Dec. 16, 2019

(65) Prior Publication Data

US 2020/0113196 A1    Apr. 16, 2020

Related U.S. Application Data

(63) Continuation of application No. 15/557,643, filed as application No. PCT/JP2016/001348 on Mar. 10, 2016, now Pat. No. 10,561,154.

(30) Foreign Application Priority Data

Mar. 13, 2015  (JP) .................................. 2015-051057
May 18, 2015  (JP) .................................. 2015-100898
(Continued)

(51) Int. Cl.
*A23L 3/02*  (2006.01)
*A47J 37/04*  (2006.01)
(Continued)

(52) U.S. Cl.
CPC ............ *A23B 4/005* (2013.01); *A23B 4/0053* (2013.01); *A23B 7/0408* (2013.01); *A23B 7/06* (2013.01);
(Continued)

(58) Field of Classification Search
CPC ....... A23L 3/02; A23L 5/10–21; A23B 4/005; A47J 37/044–045
See application file for complete search history.

(56) References Cited

U.S. PATENT DOCUMENTS

| 4,758,442 A | 7/1988 | Wells |
| 2010/0037653 A1 | 2/2010 | Enis |
| 2012/0328752 A1 | 12/2012 | Green |

FOREIGN PATENT DOCUMENTS

| JP | 58-060960 | 4/1983 |
| JP | 5-137500 | 6/1993 |

(Continued)

OTHER PUBLICATIONS

Notification No. 1766w/SHTT-SC for related Vietnamese Patent Application No. 1-2017-04074 dated Jan. 29, 2021 and English translation.

(Continued)

*Primary Examiner* — Michael A LaFlame, Jr.
(74) *Attorney, Agent, or Firm* — Renner, Otto, Boisselle & Sklar, LLP

(57) ABSTRACT

A food processing system is provided with: a heating unit equipped with a heating mechanism for indirectly heating food; a cooling unit equipped with an air blowing cooler for cooling the food heated by the heating unit; and a conveyor for transferring the food through the heating unit and the cooling unit. The integrated food processing system allows a large amount of sterilized food having a good texture, good taste and long shelf life to be provided.

7 Claims, 7 Drawing Sheets

(30) Foreign Application Priority Data

Sep. 18, 2015 (JP) ................................ 2015-185367
Feb. 16, 2016 (JP) ................................ 2016-026877

(51) Int. Cl.

| A23B 4/005 | (2006.01) |
|---|---|
| A23B 7/06 | (2006.01) |
| A23L 5/10 | (2016.01) |
| A23L 27/16 | (2016.01) |
| A23L 3/18 | (2006.01) |
| A23L 19/00 | (2016.01) |
| A23B 7/04 | (2006.01) |
| A23L 3/36 | (2006.01) |

(52) U.S. Cl.
CPC ................ *A23L 3/18* (2013.01); *A23L 3/185* (2013.01); *A23L 3/36* (2013.01); *A23L 3/361* (2013.01); *A23L 5/10* (2016.08); *A23L 19/00* (2016.08); *A23L 19/03* (2016.08); *A23L 27/16* (2016.08)

(56) References Cited

FOREIGN PATENT DOCUMENTS

| JP | 7-123949 | 5/1995 |
|---|---|---|
| JP | 9-294535 | 11/1997 |
| JP | 10-313839 | 12/1998 |
| JP | 2000-333655 | 12/2000 |
| JP | 2000-354459 | 12/2000 |
| JP | 2001-29055 | 2/2001 |
| JP | 2002-119224 | 4/2002 |
| JP | 2002-199986 | 7/2002 |
| JP | 2003-325118 | 11/2003 |
| JP | 2004-081041 | 3/2004 |
| JP | 2005-151939 | 6/2005 |
| JP | 2005-323572 | 11/2005 |
| JP | 2006-204808 | 8/2006 |
| JP | 2006-246828 | 9/2006 |
| JP | 2007-205705 | 8/2007 |
| JP | 2007-228870 | 9/2007 |
| JP | 2007-295817 | 11/2007 |
| JP | 2008-271902 | 11/2008 |
| JP | 2012-231688 | 11/2012 |
| JP | 5130363 | 11/2012 |
| JP | 2013-121321 | 6/2013 |
| JP | 2013-243987 | 12/2013 |
| JP | 2014-74 | 1/2014 |
| JP | 2014-025665 | 2/2014 |
| JP | 2014-516574 | 7/2014 |
| WO | 2012/171852 A1 | 12/2012 |
| WO | 2015/003080 A1 | 1/2015 |

OTHER PUBLICATIONS

Subsequent Substantive Examination Report for related Philippine Patent Application No. 1/2017/501670 signed Jan. 6, 2021.
Second Office Action for related Chinese Patent Application No. 201680021952.9 dated Apr. 28, 2021 and its English translation.
Decision of Rejection for related Chinese Application No. 201680021952.9 dated Jul. 28, 2021 and its English translation.
First Examination Report for related Indian Application No. 201717035757 dated Jun. 22, 2021.
Osamu Hasebe, "Ion Cluster Air", Applications of Heat Pump, 1996, vol. 41, pp. 40 to 43 and partial English translation.
Official Action for related Japanese Patent Application No. 2016-026877 dated Apr. 14, 2016.
Official Action for related Japanese Patent Application No. 2016-026877 dated Aug. 8, 2016.
International Search Report for corresponding International Application No. PCT/JP2016/001348 dated Apr. 11, 2016.
Communication pursuant to Rules 70(2) and 70a(2) EPC for corresponding European Application No. 16764458.2 dated Sep. 4, 2018.
Extended European Search Report for corresponding European Application No. 16764458.2 dated Aug. 17, 2018.
National Center for Home Food Preservation: How Do I? Freeze, Apr. 18, 2014, pp. 1-4.
Digel I et al.; "Bactericidal Effects of Plasma-Generated Cluster Ions", Medical and Biological Engineering and Computing, Springer, vol. 43, No. 6, Nov. 1, 2005, pp. 800-807.
English translation of JP 2002-19986 to Kawamura (Year: 2000).
Allowed claims of co-pending related U.S. Appl. No. 15/557,643, filed Sep. 12, 2017.
First Office Action for related Chinese Patent Application No. 201680021952.9 dated Aug. 3, 2020 and its English translation.
Official Action for related Indonesian Patent Application No. P00201706970 dated Jun. 5, 2020 and its English translation.
Substantive Examination Report (Restriction) for related Philippine Patent Application No. Jan. 2017/501670 dated Jun. 10, 2020.
Communication pursuant to Article 94(3) EPC for related European Patent Application No. 16764458.2 dated Jul. 17, 2020.
Office Action for related Canadian Application No. 2,979,323 dated Jan. 18, 2022.

[Fig. 1A]
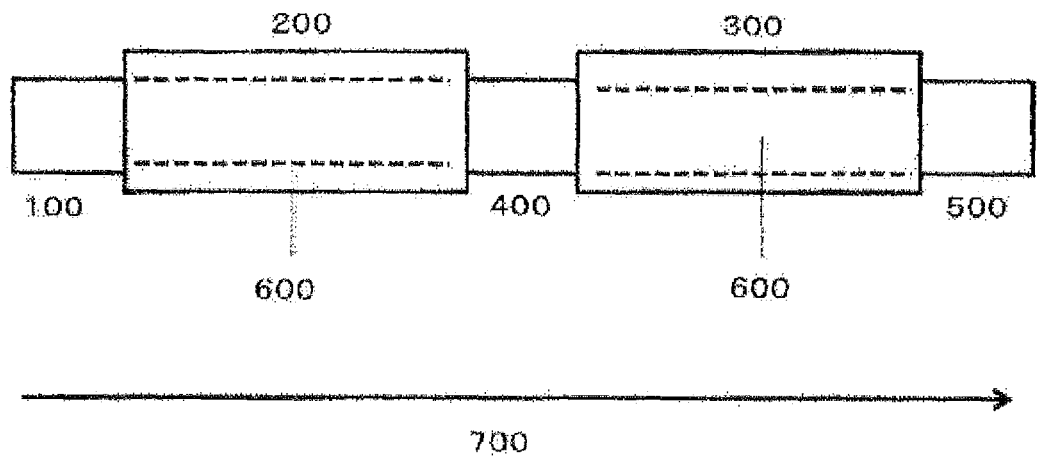
[Fig. 1B]
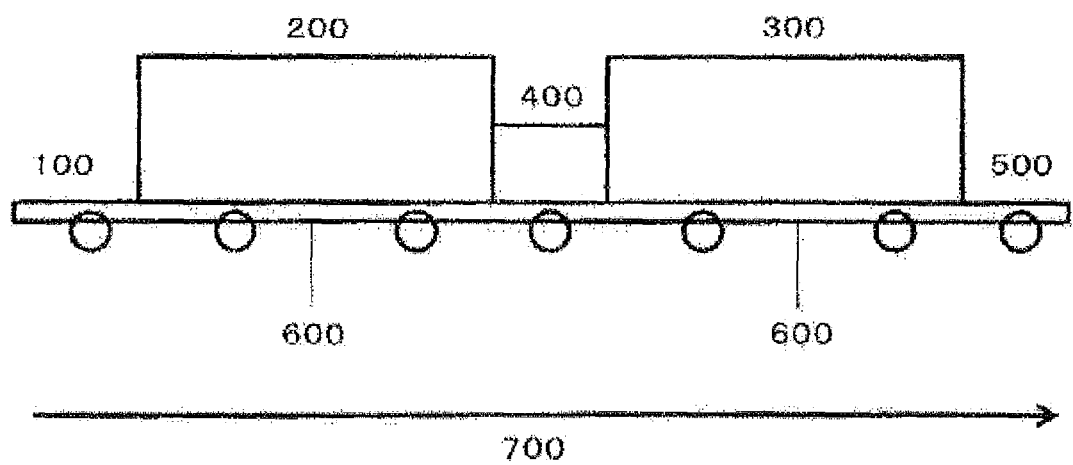
[Fig. 2]
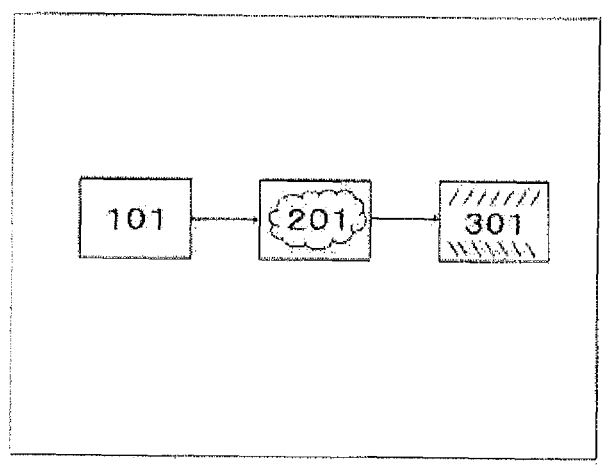

[Fig. 3]
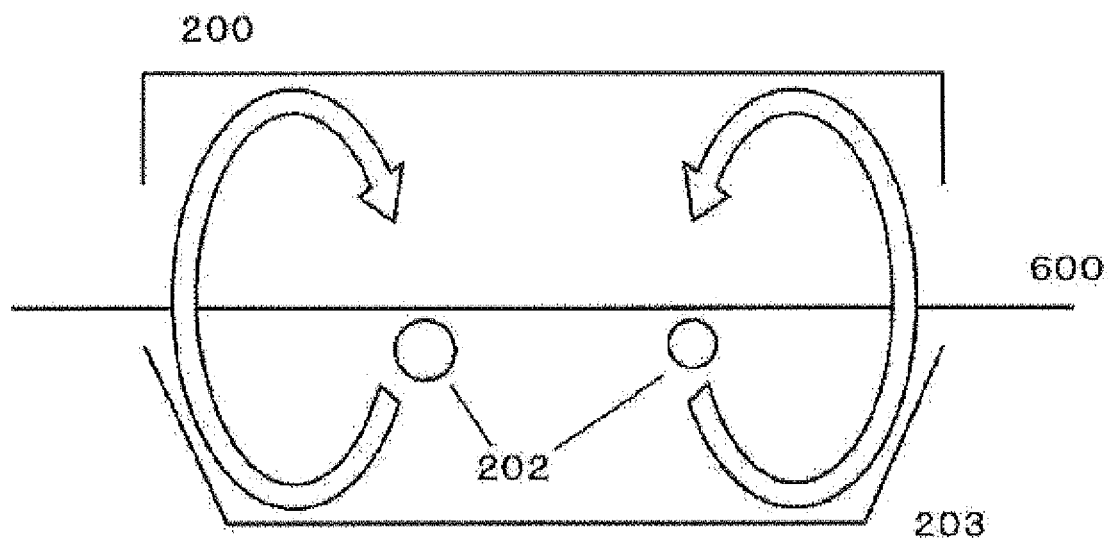
[Fig. 4]
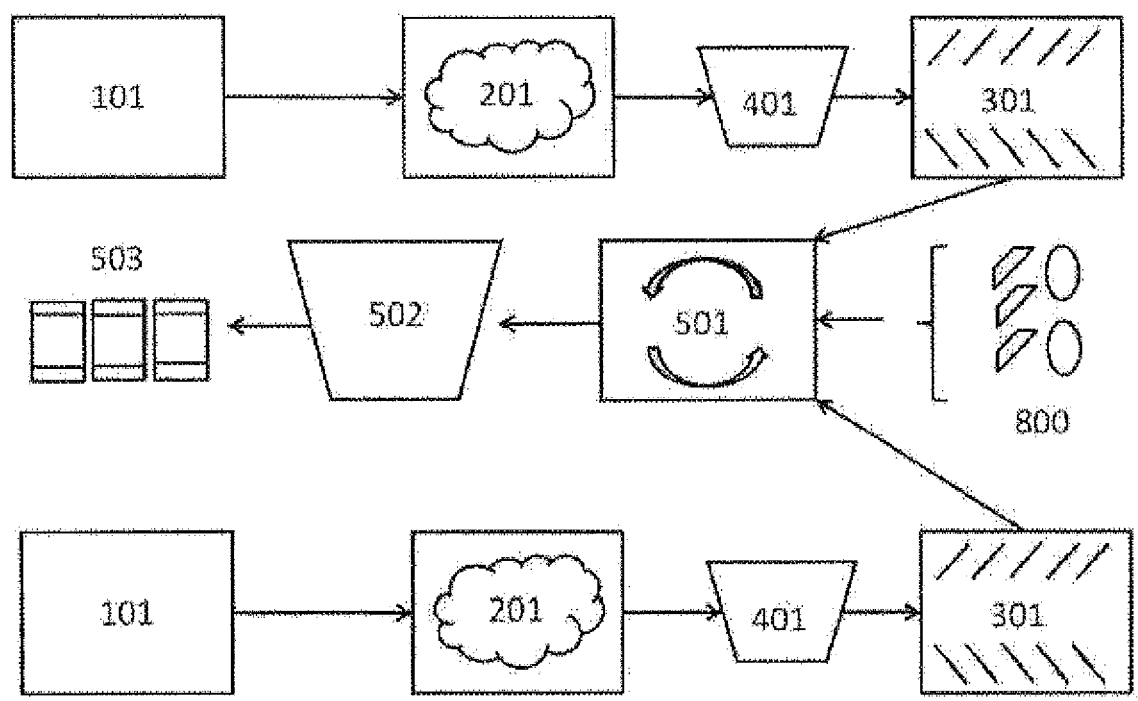

[Fig. 5]
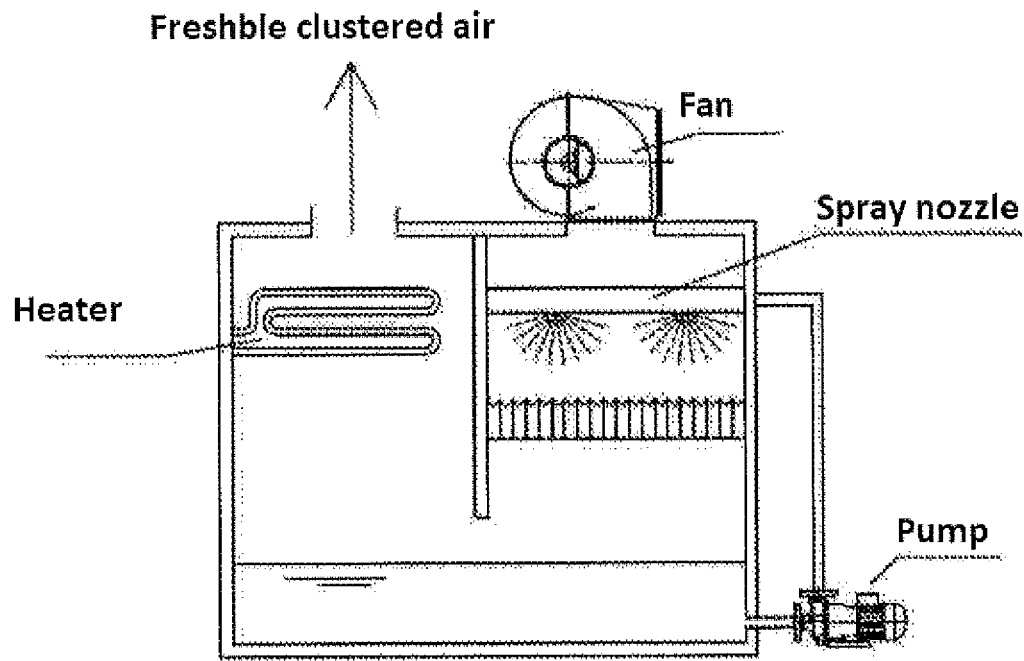
[Fig. 6A]
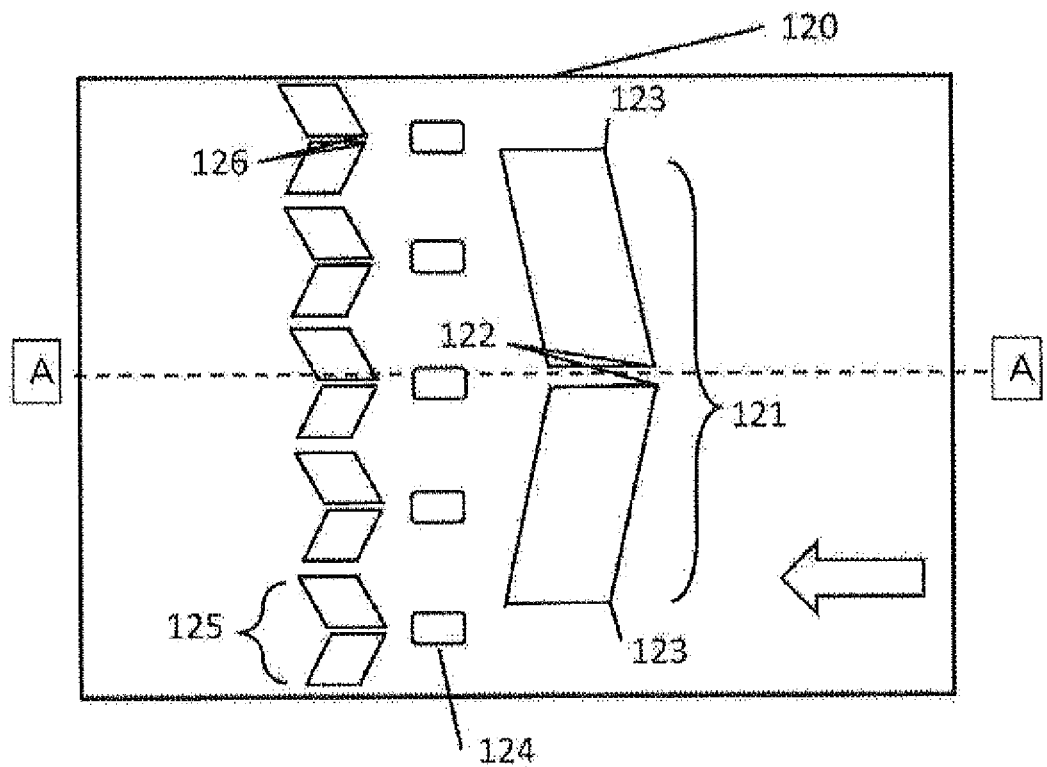

[Fig. 6B]
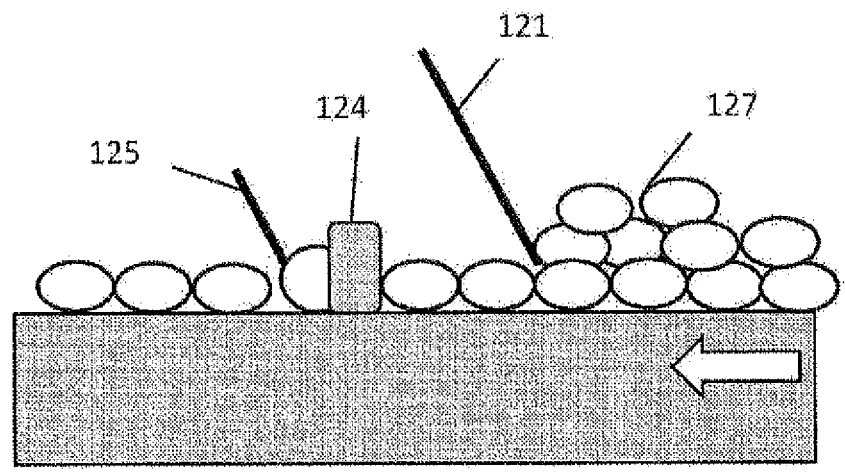
[Fig. 7A]
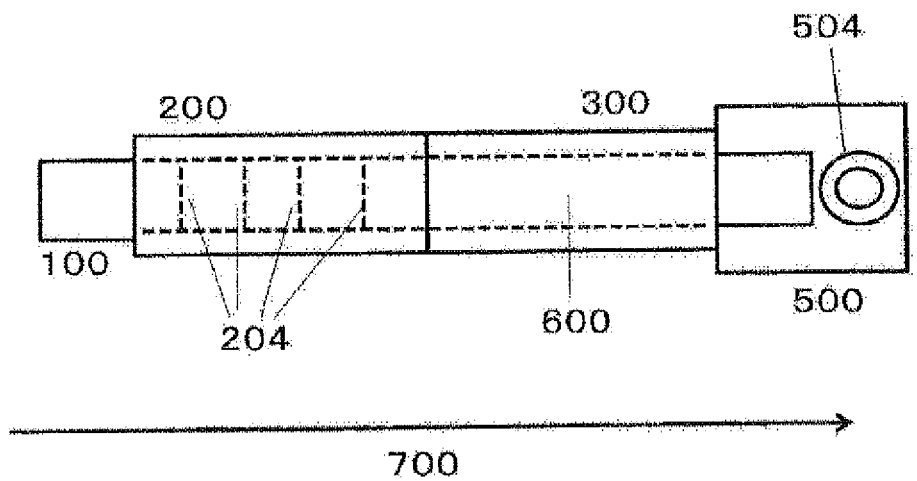
[Fig. 7B]
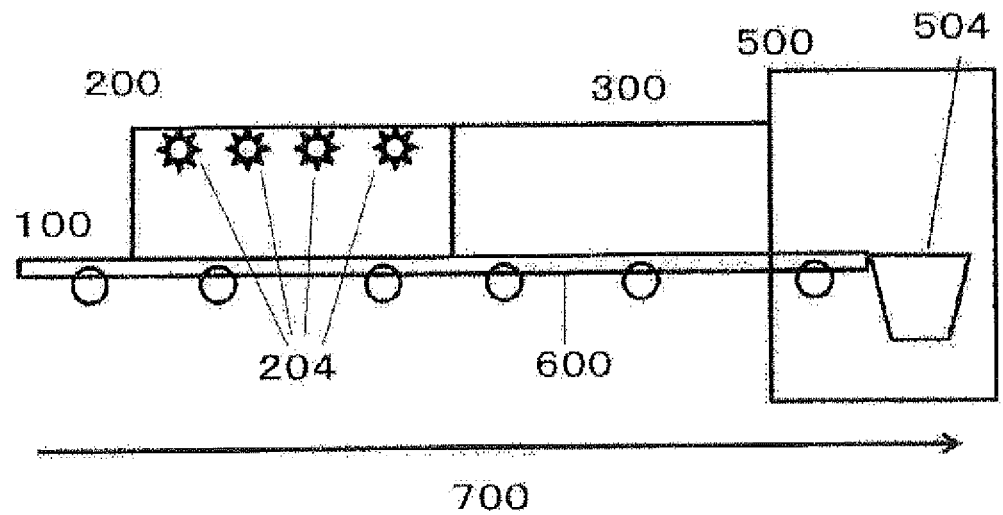

[Fig. 8]
[Fig. 9]
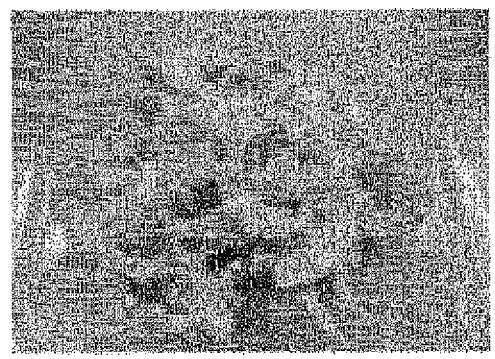
[Fig. 10]
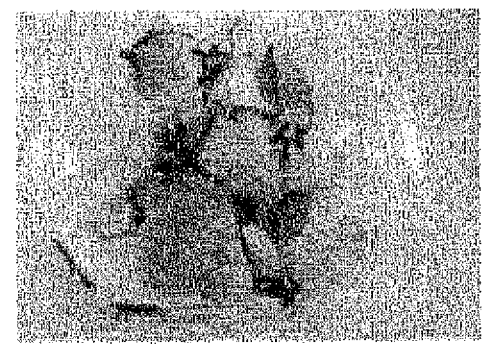
[Fig. 11]
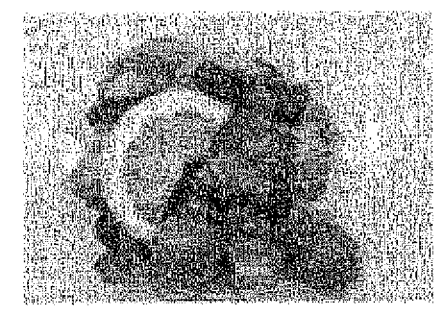

[Fig. 12]
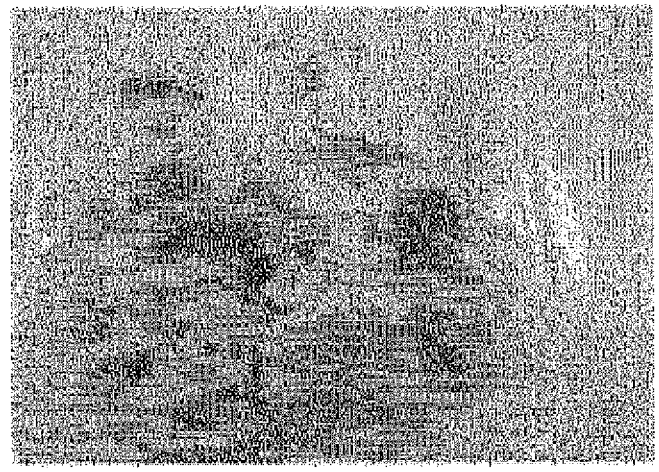
[Fig. 13]
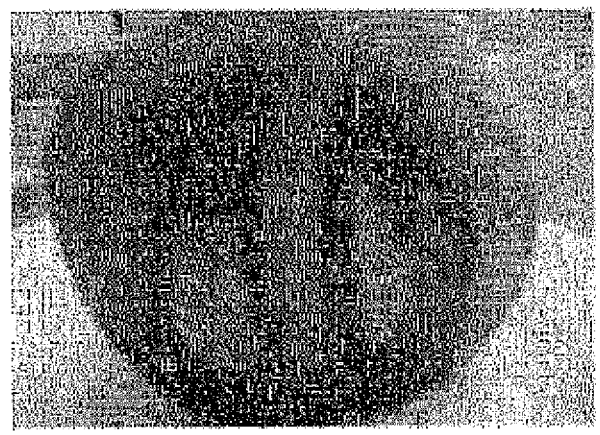
[Fig. 14]
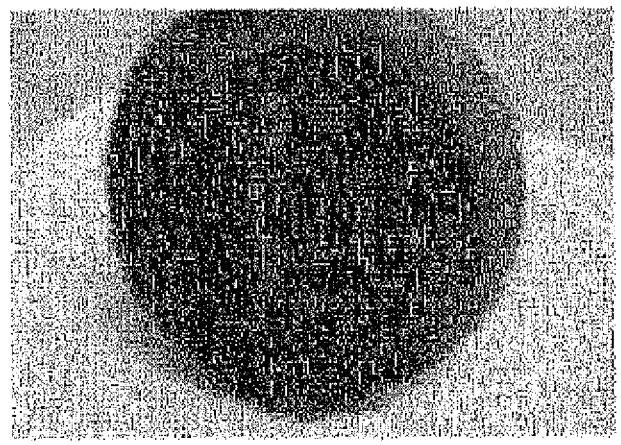

[Fig. 15]
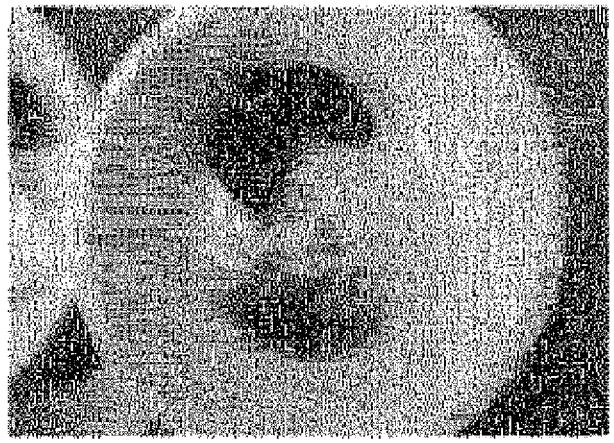
[Fig. 16]

INTEGRATED HEATING AND COOLING FOOD PROCESSING SYSTEM

TECHNICAL FIELD

The present invention relates to a food processing system for integral heating and cooling, processed food that is processed using the system, and a method of producing processed food using the system.

BACKGROUND ART

Various convenient methods for producing prepared food items and processing food items have been proposed in recent years. For instance, a method of providing a fresh prepared food item without a preservative (Patent Literature 1) and a method of cooking meat that can prevent a change in flavor or color of the meat (Patent Literature 2) have also been proposed. However, the food processing methods as described in Patent Literatures 1-2 are unsuited for processing a large quantity of food, resulting in a low yield and increased cost.

Various methods have been proposed as means for preventing an increase in cost in processing of food. For example, Patent Literature 3 describes that a continuous heating apparatus with two stages of heating means is used for reducing the frequency of exchanging cooking oil and producing fried food with excellent mouthfeel.

Patent Literature 4 describes that a high temperature hot water is contacted with food to improve the sterilization level of the food and to shorten the time of cooking such as boiling, simmering, or steaming.

Patent Literature 5 describes that an acid, alkali, or alcohol is used to preprocess food and then the food is heated under moderate conditions to produce a cooked food item with excellent flavor and preservability.

Patent Literature 6 describes that food is simultaneously sterilized and cooked in a short period of time by repeatedly reducing pressure and heating when cooking the food in a sealed tank.

Furthermore, extended cooking time and complex cooking methods are avoided, and many consumers believe that nutrients or mouthfeel of food is lost in food items heated at a high temperature, such as canned and retort package food items. Thus, home electronic products that can shorten cooking time (Patent Literature 7) and a method of using steam for heating and cooking under relatively moderate conditions (Patent Literature 8) have been proposed.

Especially in recent years, processed products of fresh vegetables/fresh fruits such as cut vegetables and cut fruits are becoming more prevalent. Cut vegetables are products consisting of finely cut vegetables that are filled in a container such as a bag or a plastic cup. Consumers can make salad simply by transferring the content from the container to tableware. Cut vegetables include not only products for salad, but also products for stir-frying. Consumers can directly transfer the content from a container to a pot or a frying pan for heating. By using cut vegetables, consumers are relieved of hard labor involving purchasing and carrying heavy or bulky vegetables and cutting the vegetables into a suitable size for the dish. Patent Literatures 9-13 describe a method of producing such a convenient product, i.e., cut vegetables.

However, even now, with the prevalence of low temperature transport and low temperature shelves, cut vegetables and cut fruits face problems, such as surface discoloration of fruits and vegetables and the tendency thereof to readily spoil. For this reason, discoloration prevention or sterilization is considered essential for the production of cut vegetables and cut fruits (Patent Literatures 11, 12, and 13).

For example, Patent Literature 14 describes a method of sterilizing and washing fresh food items using an aqueous solution of water-soluble chlorine dioxide and an emulsifier. This method can prevent corrosion of an apparatus or oxidation of food items with a sterilizing agent. However, this method requires an emulsifier in addition to a sterilizing agent, leading to increased cost. Moreover, a sterilizing effect is only confirmed up to 48 hours after treatment.

Patent Literature 15 describes a method for efficient sterilization by having fresh food items contact with or immersed in an aqueous mixture solution of a chlorine-based sterilizing agent, polyoxyethylene sorbitan fatty acid ester and an organic acid and/or a salt thereof. However, this method also requires the use of multiple additional agents for the sterilization. Moreover, there is a risk of impairing the flavor of food by thorough washing and draining that are required after sterilization. In this manner, it is difficult to omit all of chemical agents, washing with water, and draining in a sterilization method using a chlorine-based sterilizing agent, such that there are remaining problems in terms of cost and quality of food.

As means for solving such a problem involving the use of a chlorine-based sterilizing agent, Patent Literature 16 describes a quality retaining agent for food items containing glycerol and monoglycerol fatty acid ester. Drying or discoloration of food items can be suppressed even 10 days after processing of food with a quality retaining agent. However, this is the same as conventional sterilization methods in terms of using a certain type of agent in order to maintain quality. Moreover, the effect of quality retaining agents on the flavor of food items and the effect thereof on the human body when ingested in a large quantity have not been sufficiently studied. Further, a method of washing vegetables to aseptic levels using ozone or ultrasound has been proposed. However, the cost of a washing facility would be high, so that a conversion from a current method using a sterilizing agent is not simple.

CITATION LIST

Patent Literature

[PTL 1] Japanese National Phase PCT Laid-open Publication No. 2014-516574
[PTL 2] Japanese Laid-Open Publication No. 7-123949
[PTL 3] Japanese Laid-Open Publication No. 2006-246828
[PTL 4] Japanese Laid-Open Publication No. 2003-325118
[PTL 5] Japanese Laid-Open Publication No. 2000-354459
[PTL 6] Japanese Laid-Open Publication No. 2012-231688
[PTL 7] Japanese Laid-Open Publication No. 2002-119224
[PTL 8] Japanese Patent No. 5130363
[PTL 9] Japanese Laid-Open Publication No. 5-137500
[PTL 10] Japanese Laid-Open Publication No. 2014-74
[PTL 11] Japanese Laid-Open Publication No. 2013-243987
[PTL 12] Japanese Laid-Open Publication No. 2008-271902
[PTL 13] Japanese Laid-Open Publication No. 2001-29055
[PTL 14] Japanese Laid-Open Publication No. 10-313839
[PTL 15] Japanese Laid-Open Publication No. 2005-323572
[PTL 16] Japanese Laid-Open Publication No. 2013-121321

SUMMARY OF INVENTION

Technical Problem

As disclosed above, various food processing systems have been proposed, but a food processing system that is capable of uniformly providing sterilized processed food with excellent mouthfeel in a mass production scale has not materialized.

Solution to Problem

The inventors have developed a food processing system that integrates cooling and heating at an intermediate temperature zone as a result of diligent research in view of the aforementioned problem to complete the present invention. This integrated food processing system was named Freshble®. Heating in the intermediate temperature zone can remove harshness in taste without destroying the cells of food, inactivate enzymes in food to prevent a change from aging of the food, and achieve killing of microorganisms for sanitary management of food items. Furthermore, subsequent rapid cooling can maintain the effect of sterilization from heating by cooling food to the chilled temperature zone (about 2° C.). This is advantageous in that the present invention can thereby provide sterilized food, which has excellent mouthfeel and quality of taste as well as excellent preservability.

The inventors further studied various conditions and configuration in an integrated food processing system such as the one disclosed above to achieve uniform mass processing of food. Specifically, consistent heating and cooling of food was achieved by combining indirect heating and cooling, and preferably indirect heating and direct cooling, thereby enabling processed food consistently having the aforementioned advantages to be provided. Processing at the intermediate temperature zone in particular is very delicate, so that it was difficult to materialize stable processing. However, the inventors discovered a food processing system for achieving consistent heating and cooling of food.

The food processing system of the invention can also be advantageous in being a simple system consisting of simple steps and being able to efficiently sterilize food without impairing the flavor or outer appearance of the food without using a special agent or expensive equipment.

For example, the preferred embodiments of the present invention are the following.

(Item 1)
A food processing system comprising:
a heating unit comprising a heating mechanism for indirectly heating food;
a cooling unit comprising a cooling mechanism for cooling the food that has been heated by the heating unit; and
a transporting unit for transporting the food through the heating unit and the cooling unit.

(Item 2)
The system of item 1, wherein the cooling mechanism is configured to directly cool the food.

(Item 3)
The system of item 1, wherein the heating mechanism is located below the transporting unit.

(Item 4)
The system according to any one of items 1 to 3, wherein the heating unit comprises an air blowing mechanism.

(Item 5)
The system according to any one of items 1 to 4, wherein the cooling unit comprises an air blowing mechanism.

(Item 6)
The system according to any one of items 1 to 5,
wherein the heating mechanism comprises at least two heating mechanisms along a direction of transport of the transporting unit, and wherein a heating mechanism close to an entrance of the heating unit releases a greater amount of heat than a heating mechanism close to an exit of the heating unit.

(Item 7)
The system according to any one of items 1 to 6, wherein the heating unit comprises a temperature sensor in the vicinity of the transporting unit.

(Item 8)
The system of item 7, wherein the heating mechanism is intermittently driven by the temperature sensor.

(Item 9)
The system according to any one of items 1 to 8, wherein the heating mechanism comprises a steam supplying unit.

(Item 10)
The system according to any one of items 1 to 8, wherein the heating mechanism comprises a micro-mist supplying unit.

(Item 11)
The system according to any one of items 1 to 8, wherein the heating mechanism comprises a clustered air supplying unit.

(Item 12)
The system according to any one of items 1 to 11, wherein the transporting unit comprises a through hole.

(Item 13)
A method of producing processed food, comprising the step of processing using the system according to any one of items 1 to 12 to heat and cool food.

(Item 14)
The method of producing of item 13, wherein the food is a green onion.

(Item 15)
A method of producing a processed green onion, comprising the steps of:
heating a green onion for about 1 to 3 minutes at about 70° C. to 75° C.; and
cooling the heated green onion for about 2 to 4 minutes until a temperature thereof reaches about 2 to 4° C.

Further, examples of some embodiments of the system of the invention include the following.

Advantageous Effects of Invention

The present invention provides an integrated food processing system for consistent heating and cooling. The integrated food processing system of the invention achieves an effect of being able to supply a large quantity of sterilized food, which has excellent mouthfeel and quality of taste as well as excellent preservability.

BRIEF DESCRIPTION OF DRAWINGS

FIG. 1A is a schematic plane view of one embodiment of the food processing system of the invention. The dotted lines show a transporting unit that cannot be actually seen (100: feeding section, 200: heating unit; 300: cooling unit, 400: adjustment section, 500: unloading section, 600: transporting unit, 700: direction of transport of food).

FIG. 1B is a schematic front view of one embodiment of the food processing system of the invention (100: feeding section, 200: heating unit; 300: cooling unit, 400: adjustment section, 500: unloading section, 600: transporting unit, 700: direction of transport of food).

FIG. 2 is a diagram that schematically shows an example of the food processing method of the invention (101: pre-processing step, 201: heating step, 301: cooling step).

FIG. 3 is a diagram that schematically shows convection of steam in the heating unit of the invention (200: heating unit, 202: heating mechanism, 203: bottom section, 600: transporting section, 700: direction of transport of food)

FIG. 4 is a diagram that schematically shows an example of the food processing method of the invention (101: pre-processing step, 201: heating step, 401: seasoning step, 301: cooling step, 501: product preparation step (mix with another food), 502: product preparation step (mix with seasoning), 800: other food, 503: product preparation step (packaging step)).

FIG. 5 is a schematic diagram of a clustered air generator in one embodiment of the present invention.

FIG. 6A is a schematic plane view of a feeding section in one embodiment of the present invention (121: first height adjusting member, 124: protrusion, 125: second height adjusting member).

FIG. 6B is a schematic front view of a feeding section in one embodiment of the present invention (121: first height adjusting member, 124: protrusion, 125: second height adjusting member).

FIG. 7A is a schematic plane view of one embodiment of the food processing system of the invention (100: feeding section, 200: heating unit, 204: fan, 300: cooling unit, 500: unloading section, 504: packaging apparatus, 600: transporting unit, 700: direction of transport of food).

FIG. 7B is a schematic front view of one embodiment of the food processing system of the invention (100: feeding section, 200: heating unit, 204: fan, 300: cooling unit, 500: unloading section, 504: packaging apparatus, 600: transporting unit, 700: direction of transport of food)

FIG. 8 is a picture of marinated vegetables and seafood that was prepared by utilizing food processed by the system of the invention.

FIG. 9 is a picture of cabbage and carrot coleslaw that was prepared by utilizing food processed by the system of the invention.

FIG. 10 is a picture of cabbage with salted kelp that was prepared by utilizing food processed by the system of the invention.

FIG. 11 is a picture of cucumber and tomato seasoned with salt-based sauce that was prepared by utilizing food processed by the system of the invention.

FIG. 12 is a picture of lightly pickled Nappa cabbage that was prepared by utilizing food processed by the system of the invention.

FIG. 13 is a picture of a section of a tomato, which was processed by the system of the invention. The tomato was cut 4 days after processing.

FIG. 14 is a picture of a section of an unprocessed tomato. The tomato was cut after 4 days without processing.

FIG. 15 is a picture showing a crushed cherry tomato, which was processed with the system of the invention in a crushed state. The cherry tomato was cut 4 days after processing.

FIG. 16 is a picture of an unprocessed crushed tomato. The tomato was crushed after 4 days without processing.

DESCRIPTION OF EMBODIMENTS

The present invention is explained hereinafter with exemplary Examples while referring to the appended drawings as needed. Throughout the entire specification, a singular expression should be understood as encompassing the concept thereof in the plural form, unless specifically noted otherwise. Further, the terms used herein should be understood as used in the meaning that is commonly used in the art, unless specifically noted otherwise. Thus, unless defined otherwise, all terminologies and scientific technical terms that are used herein have the same meaning as the general understanding of those skilled in the art to which the present invention pertains. In case of a contradiction, the present specification (including the definitions) takes precedence.

Definitions

As used herein, "food" refers to any object that can be consumed by humans. Food that has not been processed by heating at 100° C. or higher is especially referred to as "fresh food".

As used herein, "intermediate temperature zone" refers to a temperature of 45° C. to 90° C.

As used herein, "indirect heating" refers to releasing of a heat mediating substance such as steam from a supplying unit so that the direction of movement of the heat mediating substance is altered before arriving at a subject to be heated from the supplying unit, when heating the subjected to be heated by having the heat mediating substance make contact therewith.

As used herein, "direct heating" refers to releasing of a heat mediating substance such as steam from a supplying unit so that the direction of movement of the heat mediating substance is not altered before arriving at a subject to be heated from the supplying unit, when heating the subject to be heated by having the heat mediating substance make contact therewith.

As used herein, "direct cooling" refers to sending cool air toward a subject to be cooled with an air blowing mechanism such as a fan.

As used herein, "indirect cooling" refers to cooling without using an air blowing mechanism such as a fan other than a cooling mechanism, or sending cool air without directing the air to a subject to be cooled when cool air is sent with an air blowing mechanism.

As used herein "vicinity of a transporting unit" refers to an area at or within about 30 cm from the transporting unit.

As used herein, "steam" refers to gas comprising water droplets. As used herein, "micro-mist" refers to steam comprising water droplets with a particle size of 0.01 μm or greater and less than 10 μm. As used herein, "clustered air" refers to steam comprising water droplets with a particle size of less than 0.01 μm.

As used herein, "sterilize" refers to the live common bacteria count being $10^5$ cfu/g (mL) or less in a test by a standard agar plate culture method, or *E. coli* being negative (less than 10 cfu/g (mL)) in a test by BGLG medium method, immediately after food processing treatment.

As used herein, "integrated" heating and cooling refers heating and cooling by a single unit, in which a "transporting unit" passes through a "heating unit" and a "cooling unit" and at least the "transporting unit" and the "heating unit" as well as the "transporting unit" and the "cooling unit" are connected.

As used herein, "downward" refers to a direction that forms a 0° to 90° angle with respect to the vertically downward direction.

As used herein, "about" refers to a range of ±10% of the numerical value described thereafter.

(Food)

The food processing system of the invention can process any food. This is because removal of harshness in taste, inactivation of enzymes and sterilization by indirect heating in the intermediate temperature zone and subsequent rapid cooling in the food processing system of the invention can be achieved not uniquely to certain food, but invariably for any food.

Thus, any of one of more items selected from vegetables, fruits, mushrooms, meat, fish, shellfish, crustaceans, and seaweed that are considered edible can be processed with the food processing system of the invention. The food processing system of the invention can be applied to any of vegetables, mushrooms, fruits, sea vegetables, fish, and meat.

Any variety of vegetables that are available in the market such as leafy vegetables, root vegetables, tubers, and mushrooms can be used without limitation. Examples of leafy vegetables that can be used include cabbage, Nappa cabbage, lettuce, komatsuna, spinach, Boston lettuce, komatsuna, bok choy, mizuna, edible chrysanthemum, Japanese cryptotaenia, green allium, brassica, eggplant, zucchini, cucumber, tomato, gourd, bell pepper, paprika, okra, bean sprout, asparagus, onion, green onion, broccoli, cauliflower, garlic chives, greater burdock and the like. Examples of root vegetables that can be used include carrot, radish, turnip, lotus root, and burdock. In addition, Japanese ginger, edible wild plants, celery, herbs such as parsley and basil, corn, green bean, podded pea and the like can also be used. As tubers, any of sweet potato, potato, yam, Japanese mountain yam and the like can be used without limitation. Any variety of mushrooms known to be edible such as shiltake, shimeji, Hen of the Woods, oyster mushroom, nameko, enokitake, common mushroom, king trumpet mushroom, bolete, porcini, and truffle can be used without limitation.

Any variety of fruits that are available in the market such as citrus, berries such as strawberry, blueberry, and blackberry, cherry, and grape can be used without limitation. Any variety of sea vegetables that is available in the market such as nori, wakame, and mozuku can be used without limitation.

Any variety of fish that is available in the market such as blue-backed fish, white fish, fish with red flesh, eel, and conger eel can be used without limitation. Squids, octopi, and shellfish can also be used. Shrimps, crabs, lobsters and the like can also be used. Any variety of meat that is available in the market such as beef, pork, chicken, and meat of deer, duck, horse, and boar used in game meat cuisines can be used without limitation.

In a certain embodiment, fresh food is washed and cut in advance, and placed at the feeding section of the food processing system of the invention. The size of a piece of food is not limited, as long as it is a size that is used for various dishes and can be directly consumed or arranged on tableware. Food with such a size can be heated to an appropriate temperature, evenly from the surface to the center, in about several tens of seconds to several minutes after entering the heating unit disclosed below. The food of the invention can have any size, but generally has a size that can be placed within a cube with a side of about 30 cm.

Vegetables, fruits, and mushrooms for cut vegetables/cut fruits, which have a particularly short used-by date such that the percentage of them being disposed of at stores is high, are the preferred food of the invention because the effect of sterilization with the food processing system of the invention is significant. In particular, food that is difficult to treat with a sterilizing solution is the preferred food of the invention. Thus, allium, which is surrounded by gelatin and has microbes therein that are difficult to treat with a sterilizing solution, is the preferred food of the invention. Cucumbers, strawberries, and the like, which have hair growing in a hole that results in a surface tension to make it difficult to treat with a sterilizing solution, are also the preferred food of the invention.

(Heating Unit)

The system of the invention comprises a heating unit comprising a heating mechanism for heating food. The configuration of the heating unit and the heating mechanism is not limited, as long as food can be heated to a desired temperature. A transporting unit penetrates the heating unit, and food is heated while the food is transported by the transporting unit within the heating unit. It is desirable that food is quickly heated to a desired temperature and stably maintained thereafter at the desired temperature. Any heating unit can be used as the heating unit of the present invention, as long as the temperature can be adjusted, such as a heating unit that is commonly used in cooking food items or a thermostatic tank with a humidifying function. To be compatible for various types of food, the shape of the heating unit is preferably, but is not limited to, a tunnel shape or a box shape that extends along the direction of transport of food.

Preferably, the system of the invention can quickly heat and stably maintain food at the intermediate temperature zone. Heating at the intermediate temperature zone can remove harshness in taste and/or inactivate enzymes (examples thereof include, but are not limited to, glycolytic enzymes such as pectinase and cellulase, oxidases such as glucose oxidase and the like), and/or sterilize food without destroying cells or tissue of the food. On the other hand, heating at a temperature exceeding 100° C. (heating using boiling water or flame) is not preferred in the present invention, as cells of food are destroyed, resulting in umami components flowing out from the cells.

The heating mechanism heats food preferably by releasing heat inside the heating unit. In one embodiment, heat can be mediated by a high temperature substance that can heat food by contacting the food. Heat released inside a heating unit can raise the temperature inside the heating unit to heat food.

In a representative embodiment of the present invention, a heating unit indirectly heats food. With direct heating, heat mediating substances in contact with food are separated into a heat mediating substance with a relatively high temperature that directly contacts the food from a supplying unit and a heat mediating substance with a relative low temperature that is circulated in convection in the heating unit. The temperature difference thereof is significant such that it is difficult to stably maintain a temperature for heating food. In comparison, "indirect" heating can stably maintain the temperature for heating food, as the temperature difference of heat mediating substances in contact with food is small. Further, indirect heating can readily heat food at a constant temperature, for example, by intermittently supplying heat with a constant temperature (e.g., 98° C. steam). Thus, a complex mechanism for finely controlling the temperature of a heat mediating substance would not be required. As a result, cost reduction can be achieved. On the other hand, intermittently supplied heat mediating substance in direct heating cannot achieve consistent heating of food in some cases as a result of a significant difference in the temperature for heating food in the presence and absence of a heat mediating substance with a relatively high temperature that directly contacts the food, i.e., while a heat mediating substance is supplied and while supply thereof is stopped.

In a preferred embodiment, the heating unit of the invention indirectly heats food. Controlling the heating at the intermediate temperature zone in the present invention is difficult. Specifically, excessive heating would destroy cells of food to impair the taste and mouthfeel of the food, while insufficient heating would result in insufficient sterilization or removal of harshness in taste. For this reason, the inventors controlled the temperature to be consistent in a region where food passes through in the heating unit instead of directly heating the food, resulting in the achievement of a consistent heating temperature control for food.

For example, a substance with a high temperature, in principle, would have low density and relatively moves up. However, releasing a heat mediating substance downwards can induce convection of the heat mediating substance to stably maintain the temperature within the heating unit within a constant range.

In a preferred embodiment, a heating unit further comprises an air blowing mechanism (e.g., fan). Such a fan can constantly generate convection near the food to maintain the temperature contacting the food to be constant. The air blowing mechanism in the heating unit preferably does not blow air towards a transporting unit, but does so in a direction that is not towards the transporting unit. This is for facilitating control in the intermediate temperature zone in the vicinity of the transporting unit by not directly blowing air onto food as in indirect heating.

Furthermore, the temperature may be difficult to stabilize near the top or bottom surface in the heating unit. Thus, the transporting unit penetrating the heating unit, which is configured to pass through the middle portion between the top and bottom surfaces of the heating unit, can avoid having a region that tends to have an unstable temperature to allow heating food consistently in a stable temperature region.

The heating mechanism of the invention can heat food to about 45 to about 90° C., preferably about 50° C. to about 85° C., and more preferably about 60° C. to about 75° C. However, the temperature at which food is heated with the heating mechanism in the system of the invention varies depending on the food or application. Such a temperature can be appropriately determined by those skilled in the art. It should be noted that heating of food can be confirmed by measuring the core temperature.

The temperature of heat released by the heating mechanism of the invention may be any temperature that can achieve heating of intended food. Typically, the temperature of released heat can be 98° C.

The heating mechanism can be any mechanism that can achieve heating of food at the intermediate temperature zone. Examples thereof include, but are not limited to, steam supplying units, micro-mist supplying units, clustered air supplying units and the like.

In one embodiment of the present invention, a heat mediating substance is steam, and the heating mechanism of the invention can be a steam supplying unit. However, water droplets may adhere to the surface of food when heated using steam. When it is preferable to avoid such adherence of water droplets, the heating mechanism may heat food using a heat mediating substance comprising water droplets with a smaller particle size, such as micro-mist or clustered air.

In a certain embodiment, a heat mediating substance is micro-mist. A method of generating micro-mist is known. Although not wishing to be bound by any theory, use of micro-mist for heating can suppress adhesion of water droplets on food, as steam comprises fine water droplets (water droplets with a particle size of 0.01 μm or greater and less than 10 μm). Prevention of adhesion of water droplets on food can lead to maintaining a condition under which microbes do not readily proliferate. Furthermore, prevention of adhesion of water droplets on food can render a drying step unnecessary.

Micro-mist can be generated by a known generator or a generation method. For example, a mass of water can be made to collide with a fan rotating at a high speed to apply a physical impact to fragment the mass of water into fine water particles to generate micro-mist consisting of fine water particles. High temperature micro-mist can be generated by using high temperature water as the mass of water.

The particle size of a heat mediating substance can be appropriately selected depending on the type or size of food. For example, green onions, cut fruits, meat, crabs and the like are preferably heated with clustered air from the viewpoint of preventing adhesion of water droplets or efficiency of thermal conduction. Since there is relatively less of a need to prevent adhesion of water droplets on vegetables in their original form, steam may be used for heating.

In a certain embodiment, a heat mediating substance is clustered air. Since clustered air comprises finer water droplets (water droplets with a particle size of less than 0.01 μm) in steam than the aforementioned micro-mist, the efficiency of thermal conduction to food can be enhanced while suppressing adhesion of water droplets on the food without using a high temperature. Prevention of adhesion of water droplets on food can lead to maintaining a condition under which microbes do not readily proliferate. Without the need for a drying step, efficient processing is made possible, so that cost can be reduced. Further, since food can be heated quickly to the processing temperature, this can ensure a better effect of heating in the removal of harshness in taste, sterilization, or inactivation of an enzyme.

In a certain embodiment, a heating mechanism can heat food by ejecting a heat mediating substance such as steam. In a certain embodiment, a heating mechanism heats food by ejecting a heat mediating substance of 98° C. As disclosed above, the heating mechanism is configured so that an ejected heat mediating substance indirectly heats food. Examples of such a configuration include, but are not limited to, a configuration comprising the heating mechanism beneath a transporting unit and a heat mediating substance ejection hole directed downwards. Preferably, the heating mechanism does not continuously eject a heat mediating substance, but intermittently ejects a heat mediating substance with an interval between ejections. In a certain embodiment, an ejection hole can be opened and closed. In another embodiment, opening and closing of an ejection hole is controlled automatically, or by an external input.

In a certain embodiment, a heating unit comprises a sensor. Examples of sensors include temperature sensors and humidity sensors. A sensor quantifies and transmits information related to the condition inside the heating unit. Information related to the condition inside the heating unit may be transmitted to an administrative unit or another part of a system such as a transporting unit, heating unit, or cooling unit. The position of the sensor is not limited, but the sensor can be preferably disposed in the vicinity of the transporting unit that penetrates the heating unit. In the system of the invention, it is important to maintain a consistent temperature in a region where food passes through. Thus, it may be advantageous to control a heating mechanism in accordance with a measurement value of the temperature in the vicinity of the transporting unit. In a certain embodiment, a sensor is at a distance of about 30 cm or less, preferably about 15 cm from a transporting unit in a heating unit.

In a certain embodiment, the heating mechanism is intermittently driven by a temperature sensor. For example, when a measurement value of the temperature sensor provided in the vicinity of a transporting unit reaches a defined temperature, the lid of an ejection hole for a heat mediating substance such as steam can be closed to stop discharge of the heat mediating substance, and when the temperature decreases, the heat mediating substance is ejected again to mix air in a heating unit with the heat mediating substance at a suitable ratio to maintain the temperature in the heating unit constant.

When the heating mechanism is a steam supplying unit, a boiler or a water pipe, a power source or the like on the outside of the heating mechanism can be automatically controlled based on a value of the internal temperature and/or humidity detected by the aforementioned sensor to automatically control the temperature of steam and the amount of steam released in order to maintain the internal temperature in a predetermined temperature region upon operating the steam supplying unit. The time period the food is in the heating unit is 1 to 8 minutes, and preferably 1 to 3 minutes. The time period is suitably adjusted depending on the thermal conductivity of the food and the size of cut food. The surface of food can be sterilized as a result of exposure to the above-described internal temperature for such a time period.

Preferably, the heating unit is configured so that a heat mediating substance such as steam can circulate in convection. Even if there is variability in the temperature throughout the entire heating unit, the extent of heating of food during a heating step can be consistent with convection of the heat mediating substance. Further, the amount of heat mediating substance in contact with food per time can be increased, so that the food can quickly reach a desired temperature without using a high temperature.

In a certain embodiment, the bottom section of a heating unit can have a shape that induces convection of a heat mediating substance such as steam. Examples of such a shape include, but are not limited to, a boat shape with edges of a bottom section that are processed to have an incline. Convection of a heat mediating substance can function as a so-called air curtain for blocking the entry of cold outside air into a heating unit and/or leakage of warm heat mediating substance from inside the heating unit by convection in the top and bottom directions at a loading entrance of the heating unit and the unloading exit.

A heat mediating substance (e.g., steam) generates convection on its own at a high temperature exceeding 90° C. Meanwhile, generated convection is moderate at, for example, a temperature zone around 70° C. Thus, it may be desirable to use a mechanism that proactively generates convection of a heat mediating substance.

The heating unit preferably has an air blowing mechanism as a mechanism for proactively generating convection of the heat mediating substance. The air blowing mechanism can promote convection of a heat mediating substance in the heating unit. Any air blowing mechanism can be used, as long as it is used in an air blower or air conditioner such as sirocco fan, turbo fan, airfoil fan, or cross flow fan. The configuration of the air blowing mechanism is not particularly limited in terms of the number, position, or direction thereof, or the like. The air blowing mechanism may be on the top or side portion of the heating unit or both, or at another location. In a certain embodiment, the direction towards which an air blowing mechanism blows air may be in a direction towards food or a direction that is not towards food. In a preferred embodiment, the direction towards which an air blowing mechanism in a heating unit blows air is not in the direction towards food. The strength of air blown by an air blowing mechanism is not limited, as long as sufficient convection of a heat mediating substance is generated. The strength may be constant or variable. The number of air blowing mechanisms (preferably fans) installed and the air blowing capacity can be suitably adjusted while taking into consideration the volume of the heating unit, type and amount of food to be processed, transport speed of food, or the like. Upon operation of a heating mechanism, the temperature and humidity inside the heating unit may be continuously detected with a sensor installed in each inside section to adjust the number of rotations of a fan and the amount of air blown by the fan so that the temperature and humidity inside the heating unit would be consistent.

In a certain embodiment, a heating unit is not sealed. This is because cells of food could be destroyed by the pressure of air expanded by heat when the heating unit is sealed. In such a case, releasing sections provided at a feeding entrance and a discharge exit play the role of a pressure valve, and convection of a heat mediating substance can play the role of an air curtain.

The heating unit may have a single or multiple heating mechanisms. In a certain embodiment, a heating mechanism comprises at least two heating mechanisms along the direction of transport of a transporting unit. In a certain embodiment, a heating mechanism is a pipe comprising an ejection hole for a heat mediating substance such as steam. There may be multiple pipes. The amount of heat released by multiple heating mechanisms may be different. In a certain embodiment, a heating mechanism close to an entrance of a heating unit releases a greater amount of heat than a heating mechanism close to an exit of the heating unit. In a certain embodiment of the present invention, a heating unit comprises at least two heating mechanisms along the direction of transport of a transporting unit, and a heating mechanism close to the entrance of the heating unit can release a greater amount of heat mediating substance than a heating mechanism close to the exit of the heating unit. In a certain embodiment, pipes of a heating mechanism are multiple pipes with different diameters. Preferably, the diameter of a pipe close to the feeding entrance is greater than the diameter of a pipe close to the discharge exit. According to such a configuration with the heating mechanism close to the entrance of heating unit releasing a greater amount of heat than the heating mechanism close to the exit of the heating unit, heating of low temperature food fed into the heating unit to a predetermined temperature can be further promoted, and the temperature can be maintained at the predetermined temperature after reaching the predetermined temperature, whereby the processing time of food at the intended predetermined temperature can be ensured for longer. In a certain embodiment, ejection holes of multiple pipes each comprise an independently controlled opening and closing valve.

In some embodiment, a heating unit is a steam heater. In some embodiments, a heating unit is a steamer extending along the direction of transport of food, and a heating mechanism releases a heat mediating substance (examples thereof include, but are not limited to, steam, micro-mist, clustered air, and the like) in the steamer from numerous microholes provided on an inner wall of the steamer.

In a certain embodiment of the system of the invention, a heating unit is, for example, a site for heating food for 1 to 8 minutes under a humid atmosphere at 45° C. to 90° C., and is preferably a steamer extending along in the direction of transport. A transporting unit penetrates the inside of the heating unit. In a certain embodiment, a feeding section and a heating unit are continuous in the food processing system of the invention. In a certain embodiment, food is continuously loaded into a heating unit that is opened for a transporting unit during operation of the food processing system of the invention. During the process of the food passing through the inside of the heating unit, the temperature of the food rises from the surface, and subsequently the temperature of the center portion also rises to 45° C. to 90° C., and the heated state is sustained, from the surface to the center portion, for 1 to 8 minutes.

In some embodiments, the internal temperature of a heating unit is adjusted in accordance with the type of food. For example, the temperature is adjusted to a comparatively high temperature region when heating a large piece of food with low thermal conduction. For example, the temperature is adjusted to a comparatively low temperature region when heating a small piece of food with excellent thermal conduction. The internal temperature of the heating unit is maintained at 45° C. to 90° C., preferably 50° C. to 85° C., and more preferably 60° C. to 80° C. The time period during which food is in the heating unit is 1 to 8 minutes, and preferably 1 minute to 3 minutes. The time period can be suitably adjusted depending on the thermal conductivity of food and the size of cut food. During the process of the food passing through the inside of the heating unit, the temperature of the food rises from the surface, and subsequently the temperature of the center portion also rises to 45° C. to 90° C., and the heated state is sustained, from the surface to the center portion, for 1 to 8 minutes and preferably 1 to 3 minutes. The internal temperature of the heating unit lower than 45° C. is not preferred, because enhancement in taste of food and short final cooking time cannot be expected. The internal temperature of the heating unit in excess of 95° C. is not preferable because food loses the flavor of fresh food by being subjected to normal heating preparation such as simmering, baking, frying, or steaming.

In a certain embodiment of the present invention, a heating unit is preferably a steamer for heating food by generating a mist-like heat mediating substance such as steam inside. The shape of the heating unit is preferable oblong shape extending along the direction of transport. The heat mediating substance is released within the steamer from numerous microholes provided on an internal wall of such a steamer to heat the surface of continuously moving food consistently. A boiler or water pipe, a power source, a temperature sensor, a humidity sensor, or the like accompanies such a steamer for humidification and heating. The temperature and humidity of the inside of the steamer are set to an optimal value that is dependent on the type and size of food. The humidity of heat mediating substance and the amount of the heat mediating substance released are automatically adjusted based on the settings and automatically measured values of humidity and temperature inside the steamer. An air blowing fan provided at an adjustment section is also used for such automatic adjustment in a short period of time.

The section where food exits the heating unit (exit) is also open during the operation of the food processing system of the present invention, as is the entrance of the heating unit. Food continuously moves within the heating unit without stagnation and is discharged from the heating unit to the adjustment section or a cooling unit.

(Heating Step)

The method of producing processed food of the invention comprises a step of heating food using a heating unit. The step of heating food may be a step of indirectly heating food.

The food, while passing through the heating unit, is heated, for example, for 1 to 8 minutes and preferably for 1 minute to 3 minutes. This time period can be changed by adjusting the speed of transporting unit.

The heating step can be in a form of a combination of various heating time periods and temperatures. For example, in a certain embodiment, root vegetables are heated for 3 to 7 minutes at 75 to 90° C. In another embodiment, leafy vegetables are heated for 1 to 3 minutes at 60 to 75° C. In still another embodiment, fruit vegetables are heated for 1 to 3 minutes at 45 to 75° C. In still another embodiment, animal derived food is heated for 3 to 8 minutes at 75 to 90° C.

For example, in one embodiment of the present invention, a heating step transports washed and cut food to an end section of a heating unit whose internal temperature is maintained at a predetermined constant temperature in the range of 45° C. to 90° C., and then generate convection with an optionally installed fan inside a stem heater, and transports the food inside the heating unit over 1 minute to 8 minutes while blowing air onto the surface of the food to raise the temperature of the food. Food can be heated without exposure to outside air in the heating step.

The steam heater is coupled to the cooling unit disclosed below. Food that has completed the heating step is immediately transferred to the cooling step disclosed below with hardly any contact with outside air. Since the food hardly has an opportunity to be in contact with outside air during the heating and cooling steps, the surface of the food is exposed to cold air inside the cooling unit while retaining the state of the surface, where microbes are dead due to heating in the heating step.

(Cooling Unit)

The system of the invention comprises a cooling unit comprising a cooling mechanism for cooling food. The configuration of the cooling unit and the cooling mechanism is not limited, as long as the inside of the cooling unit can be maintained at a desired temperature.

The cooling unit can maintain the inside thereof at −10° C. to −40° C., −10° C. to −35° C., −10° C. to −30° C., −10° C. to −25° C., −10° C. to −20° C., −10° C. to −15° C., or a higher temperature, but the temperature is not limited thereto.

The cooing unit may comprise an air blowing mechanism. Any air blowing mechanism can be used, as long as it is used in an air blower or air conditioner such as sirocco fan, turbo fan, airfoil fan, or cross flow fan. The configuration of the air blowing mechanism is not particularly limited in terms of the number, position, or direction thereof, or the like. The air blowing mechanism may be on the top or side portion of the cooling unit or both, or at another location. The direction towards which the air blowing mechanism blows air in the cooling unit may be in a direction towards food or a direction that is not towards food. The strength of air blowing by the air blowing mechanism is not limited, as long as food can be sufficiently cooled. The strength may be constant or variable. For example in a certain embodiment, the cooling mechanism is on the side of the cooling unit, and the air blowing mechanism (fan) is at the top portion.

Preferably, the cooling unit directly cools food. Specifically, the air blowing mechanism (e.g., fan) installed in the cooling unit blows air towards the food. The food can be quickly cooled thereby. This is advantageous in the present invention. This is because food that is sterilized by heating in a heating unit is at risk of having microorganisms adhere again at a temperature near 24° C. to 37° C., but the time period during which food remains in this temperature zone is shortened due to rapid decrease in the temperature by direct cooling.

In a certain embodiment, a cooling unit comprises a sensor. The sensor quantifies and transmits information related to the condition inside the cooling unit. Information related to the condition inside the cooling unit may be transmitted to an administrative unit or another part of a system such as a transporting unit, heating unit, or cooling unit. Examples of censors include temperature sensors and humidity sensors. The position of the censor is not limited, but preferably, by disposing in the vicinity of the transporting unit that penetrates the cooling unit, the temperature of food being cooled can be accurately measured so that it can be advantageous for controlling the system.

The cooling unit may be, for example, a commonly used freezer, and may be shaped as a tunnel freezer or the like.

In a certain embodiment, a cooling unit is a site for cooling food, which has been heated in a heating unit, for 2 to 8 minutes under the temperature of −10 to −40° C. The food is continuously moved inside the cooling unit and is discharged to an unloading section without stagnation. To rapidly cool food in the cooling unit, a structure that covers the entire cooling unit with a cooling apparatus, which can readily adjust the temperature, is preferable. Examples of such a cooling apparatus that is used include a tunnel freezer. The shape of the cooling unit is preferably an oblong shape extending along the direction of transport of food. As such a cooling unit, the so-called tunnel freezer is preferable. The temperature inside the freezer is maintained at −10 to −40° C. and preferably −10 to −20° C. The time period during which food is in the freezer is 2 to 8 minutes, preferably 2 to 5 minutes, and more preferably 2 to 4 minutes. The time period can be suitably adjusted depending on the thermal conductivity of food and the size of cut food. When food exits the cooling unit, the temperature of food, from the surface to the center portion, is lowered to 5° C. to −40° C. and preferably 2° C. to −20° C.

When processed food items for refrigerated storage (so-called refrigerated food items, including "chilled food items") are produced in the system of the invention, the temperature of the cooling unit is suitably adjusted so that the temperature at the center of food items at the exit of the cooling unit is about 5° C. or less, preferably about 1° C. to about 4° C., and more preferably about 2° C. When processed food items for frozen storage (so-called frozen food items) are produced in the system of the invention, the temperature of the cooling unit is suitably adjusted so that the temperature at the center of food items at the exit of the cooling unit is less than 0° C., and preferably about −2° C. to about −20° C.

(Cooling Step)

A method using the system of the invention comprises the step of cooling food using a cooling unit comprising a cooling mechanism. Preferably, the step of cooling food is a step of directly cooling food.

In some embodiments, a cooling unit preferably comprises an air blowing mechanism and rapidly cools heated food by applying cool air to the food using the air blowing mechanism. Since food passes through a temperature zone (e.g., about 20 to 40° C.) where microbes readily proliferate during the process of cooling, it is desirable to rapidly cool food to, for example, the chilled zone (e.g., about 2° C.)

While passing through the cooling unit, food is cooled, for example, for 2 to 8 minutes, preferably 2 minutes to 5 minutes, and more preferably 2 minutes to 4 minutes. In a representative embodiment, cooling time can be adjusted by changing the length of a cooling unit in accordance with the transport speed that has been set for adjusting heating time, or the temperature of the cooling unit or the air blowing intensity of an air blowing mechanism can be set so that food is sufficiently cooled. In another embodiment, cooling time can be changed by adjusting the speed of the transporting unit. Although not wishing to be bound by any theory, cooling time of over 5 minutes in the cooling unit at −40° C. results in freezing the food, which destroys cells of the food.

The temperature inside the cooling unit is not limited, but can be −10° C. to −40° C., −10° C. to −35° C., −10° C. to −30° C., or the like. Although not wishing to be bound by any theory, a temperature of food as of the end of the cooling step exceeding 10° C. may result in a risk of microbes proliferating during subsequent processes. The temperature of food after the cooling step is not limited, but is preferably about 5° C. or less, still preferably about 1° C. to about 4° C., and more preferably about 2° C. When food is frozen and preserved, the temperature of food after the cooling step may be lower.

Growth of microbes on the food surface and deterioration in quality of the inside of the food during food processing can be minimized by carrying out the heating step to the cooling step in the shortest possible time. To maintain excellent food hygiene of the processed food items of the invention, it is desirable to maintain the temperature of the processed food items of the invention that have completed the cooling step, even during subsequent steps or during packaging and transport.

Food that has undergone the cooling step can be provided directly for consumption, depending on the type of food or conditions in the seasoning step. For fruits and vegetables which are food that can be consumed raw, processed vegetables with freshness, having mouthfeel and rich taste of raw vegetables, can be provided. Such processed vegetables have quality that is absent in conventional cut vegetables and cut fruits. It is surprising that the pungent flavor of onions is removed, bitterness of burdock is removed, bitterness of spinach is removed, and unique umami is produced in lotus roots by the processing method of the invention. When the food is mushrooms, mushrooms that have undergone the cooling step can be provided directly for consumption. For fish and shellfish for sashimi, unique semi-raw fish and shellfish processed products with a "tataki" or "pickled with soy sauce" flavor is obtained. Similarly, unique semi-raw meat processed products are obtained when food is meat for sashimi, carpaccio, roast beef, or roast pork.

Such food that has undergone the cooling step to be directly edible is immediately packaged and packed, and shipped and transported as processed food items. Plastic bags, cups, boxes and the like are preferred packaging materials. Containers that are highly transparent are preferred for high visibility of food through the container. Consumers can directly consume individual processed food items and mix multiple processed food items as desired.

Alternatively, food that has undergone the cooling step can be transferred to the product preparation step disclosed below for further processing, depending on the type of food or seasoning step conditions.

In one embodiment of the present invention, the cooling step can be a rapid cooling step for transporting food that has completed the heating step to an end section of a cooling unit maintained at a predetermined internal temperature in the range of −10° C. to −40° C. without exposing the food to outside air and then transporting the food inside the cooling unit over 2 to 8 minutes to cool the food. Food is cooled without being exposed to outside air in the cooling step.

In a certain embodiment, the time period during which food is in a cooling unit is 2 to 8 minutes, preferably 2 to 5 minutes, and more preferably 2 to 4 minutes. The time period is appropriately adjusted depending on the thermal conductivity of the food and the size of cut food. The temperature from the surface to the center portion of food upon exiting the cooling unit has decreased to 5° C. to −40° C., and preferably 2° C. to −20° C. With such a setting of the temperature and time, the cooling step rapidly decreases the temperature of the entire food to a low temperature region where microorganisms do not readily proliferate, and maintains the temperature at such a low temperature region.

When food sterilized by the system of the invention is utilized as processed food items for refrigerated storage (so-called refrigerated food items; include chilled food items), the temperature of the cooling unit is appropriately adjusted so that the temperature at the center of the food items is about 5° C. or lower, preferably about 1° C. to about 4° C., and more preferably about 2° C. at the exit of the cooling unit. When food subjected to the sterilization method of the invention is utilized as processed food items for frozen storage (so-called frozen food items), the temperature of the cooling unit can be appropriately adjusted so that the temperature of the center of the food items is less than 0° C. and preferably about −2° C. to about −20° C. at the exit of the cooling unit.

An air blowing mechanism can be provided inside the cooling unit to stir air near the surface of food to enhance the cooling efficiency. The air blowing means used may be similar to an air blooding mechanism of a heating unit (e.g., fan). The surface and inside of food is maintained in a state where microbe proliferation is suppressed by rapidly cooling the food to the center portion of the food in the cooling step.

(Transporting Unit)

The food processing system of the invention comprises a transporting unit for transporting food through a heating unit and a cooling unit. The configuration of the transporting unit is not particularly limited, as long as it has a function of continuously moving the food.

It can be advantageous to heat and/or cool food while having the food move for uniformly processing a large quantity of food at a consistent temperature. For example, when food is processed at rest, there would be a difference in the processing temperature for each food due to variation in temperatures in the processing space. Meanwhile, processing while moving food along in the direction of transport of the food can eliminate the difference for each food due to variation in the temperature in the space.

The transporting unit transports food through the heating unit and the cooling unit at a constant speed. In a certain embodiment, a transporting unit has an adjusting mechanism for adjusting the constant speed. The adjusting mechanism may be capable of automatically adjusting the constant speed, adjusting to a manually set speed, or both. In a certain embodiment, a transporting unit is preferably a conveyor belt. In a certain embodiment, a transporting unit has a through hole. For example, the transporting unit with a through hole may be a meshed conveyer belt. A system may have multiple transporting units. Multiple transporting units in parallel can increase the amount of food processed per unit time to enhance the processing capability of the system of the invention. Food may be transported directly on the transporting unit or transported by the transporting unit in a container containing food. In this case, a ventilated container is preferably used. A ventilated container is, for example, a container with a through hole on the bottom and/or side surfaces. Such a container may be, for example, a container comprising a ventilated meshed member on the bottom and/or side surfaces. Inclusion of a through hole and/or meshed member in the transporting unit and/or container can not only enable food to pass through a consistent temperature, but also enable heat to equally affect each food.

The transporting speed of food can be freely determined in the range of several meters to several tens of meters per minute. The optimal transporting speed matching the type or size of food can be determined so that the food reaches the exit of the heating unit when the core temperature of the food rises to a suitable temperature and the temperature is maintained for a suitable time period. Further, the transporting unit may transport food through the cooling unit at such a transporting speed. In this case, the cooling temperature or an air blowing mechanism of the cooling unit is adjusted in accordance with the time during which food passes through the cooling unit at said transport speed.

In some embodiments of the present invention, food is continuously moved by a transporting unit to a feeding section, heating unit, adjustment section, cooling unit, and unloading section in this order. In this regard, a system may or may not have an adjustment section. A conveyor belt is preferred as the transporting unit. The speed of the transporting unit can be automatically adjusted to a suitable value in accordance with the size of each piece of food placed at the feeding section, the shape of food, heating conditions of the heating unit, or cooling conditions of the cooling unit.

When, for example, the food transporting unit used in the present invention such as a conveyor belt is constructed in a linear configuration that penetrates the heating unit and the cooling unit, starting from the feeding section for washed and cut food to the loading entrance of food into the heating unit, inside of the heating unit, end section of the cooling unit that is coupled to the heating unit, the other end of the cooling unit, and to the final food discharge exit of the cooling unit, food can be efficiently washed, cut, and sterilized in an integrated process with excellent efficiency. Food continuously moves inside the heating unit or cooling unit and never stagnates in such an integrated process. As a result, a constant amount of food can be processed and/or sterilized per unit time, enabling stable and efficient food processing and/or continuous sterilization.

(Clustered Air)

Reduction of the particle size of water to clustered air, relative to steam and micro-mist, can generate negative ions. Negative ions are generated when water collides with another object to become small particles (Lenard effect). Thus, negative ions are generated upon generating clustered air. A heating step in clustered air with negative ions can activate cells, thus maintaining freshness for a long period of time.

A method of generating such clustered air is known. For example, as described in the Journal of the Japanese Society for Food Science and Technology, Vol. 43, No. 9, 1012-1018 (1996) and the like, moisture in air forms a cluster by a hydrogen bond of water molecules, and an aggregation of such clusters floats as a large mass. Individual clusters repeatedly are generated and disappear in a short period of time. Further, the distribution of cluster size varies due to the difference in formation conditions. Thus, clustered air comprised of fine particles can be generated by having liquid mass of water crushed and divided in air flow to generate water clusters with various sizes, and removing large water clusters by further centrifugation of the clusters. Furthermore, such clustered air has been known to have a negative charge when a water mass is crushed to exhibit a physical property that is different from normal moisture containing air.

Such clustered air is utilized in cleanrooms such as aseptic rooms and is recognized as having a high dust removing and microbe removing effect. Excellent results are also reported in applications thereof in aseptic breeding of silkworms. In this manner, clustered air has been utilized in various fields, but it was discovered that application thereof to heating food can surprisingly heat the food efficiently to the core and prevent adhesion of water droplets on the food surface, as well as maintain freshness of the food even while heating, due to the generated negative ions.

Clustered air used in the food processing system of the invention is also called "Freshble clustered air".

Clustered air can be generated by any known method. For example, clustered air can be generated by the apparatus illustrated in FIG. 5. Water can be sprayed from a spray nozzle in an air flow generated by a fan to crush water droplets, and fine particles, on the air flow, are supplied as clustered air. A large water cluster is collected as a water mass at the bottom section of the apparatus. Such a cluster can be sent to the spray nozzle again with a pump. A heater can be provided in the flow path of clustered air for supplying the clustered air after being heated to a desired temperature.

(Administrative Unit)

The system of the invention may comprise an administrative unit. The administrative unit can receive information transmitted from the system of the invention and/or transmit information for controlling the system of the invention. The administrative unit can monitor internal conditions of a heating unit and/or cooling unit and control the system to prevent processing conditions to be different from expectations, such as a temperature that is different from expectation.

The administrative unit can be provided integral with the system of the invention or at a remote location. In a certain embodiment, an administrative unit displays received information or information calculated from such information to an operator, and transmits control information to a system in accordance with an input of the operator. In a certain embodiment, an administrative unit utilizes received information or information calculated from such information to automatically transmit control information to a system.

In an embodiment of the system of the invention comprising an administrative unit, conditions of each site, such as the internal temperature, internal humidity, volume of water passing through, amount of heat mediating substance (e.g., steam) released of a heating unit, the temperature of a cooling unit, the number of rotations of a fan in an adjustment section are preferably sent to the administrative unit external to an apparatus upon operation of the system of the invention. Each data can be monitored with a monitor or the like at the administrative unit. The difference between a pre-registered optimal value and actual measurement values that are continuously input is calculated and evaluated to automatically display a warning, adjust each condition, or the like with a computer at the administrative unit. Thus, the system of the invention can be continuously operated for 24 hours with a small number of operators near the apparatus and at the administrative unit. Since the system of the invention can be operated without an experienced operator, products with consistent quality can be produced in a large quantity, regardless of where the system is located.

(Feeding Section)

The system of the invention comprises a feeding section. Food is introduced into the system of the invention from the feeding section. The feeding section is a portion at the end section of a transporting unit, where food is mounted onto the continuously moving transporting unit. At the feeding section, food is loaded on the transporting unit after aligning the food at a consistent height using manual and/or mechanical means so that food is efficiently and consistently heated. The mechanical means include means for consistently leveling the fed food and means for providing a flow path for air flow between foods. General examples of means for consistently leveling the fed food include plate-like members, brushes, vibration mechanisms, and the like. Examples of means for providing a flow path for air flow between foods include protrusions, obstacles, and the like. At the feeding section, food, in general, is continuously fed to an operating transporting unit. Food starts from the feeding section and moves to a heating unit (e.g., steam heater) by the transporting unit.

The structure of the feeding section in one embodiment of the invention is explained while referring to FIGS. 6A and 6B. FIG. 6A is a schematic plane view of a feeding section in one embodiment of the present invention. FIG. 6B is a schematic front view of a feeding section in one embodiment of the present invention (cross-section at A-A in FIG. 6A). As shown in FIG. 6A, food is transported in the direction of the arrow. A first height adjusting member (121) consisting of a pair of flat board members is provided upstream in the direction of transport. A pair of first height adjusting members (121) is tilted so that an end section (123) on the end side in the width direction of a transporting unit is downstream compared to an end section (122) on the center side in the width direction. In addition, multiple protrusions (124) are provided at a predetermined interval in the width direction on the downstream side in the direction of transport of the first height adjusting members (121) in the direction of transport. Further, multiple second height adjusting members (125) consisting of a pair of flat board members that are smaller in size than the first height adjusting members are provided further downstream from the protrusions at a predetermined interval in the width direction of the transporting unit. The position of the protrusions in the width direction of the transporting unit is substantially the same as the position of end sections (126) on the center side in the width direction of the second flat board member. As shown in FIG. 6B, the height of the bottom end of the first height adjusting member is adjusted to a predetermined height from the top surface of the transporting unit. Further, the height of the bottom end of the second height adjusting member is adjusted to be the same height as that of the bottom end of the first height adjusting member. In addition, the height of the protrusions is configured to be higher than the height of the bottom end of the first height adjusting member and the second height adjusting member. For example, when food (127) is loaded onto the transporting unit at the feeding section (120), the food may be unevenly distributed towards the center in the width direction of the transporting unit. However, only food with a given height can pass through the first height adjusting member at the center section in the width direction by providing the first height adjusting member, so that uneven distribution of the height of food on the transporting unit can be prevented by some of the excess food flowing toward the end side in the width direction of the transporting unit along the inclination provided to the first height adjusting member. By providing the protrusions, food would move to both sides in the width direction of the protrusions when passing the protrusions, so that a predetermined space can be formed. Provided space can prevent through holes of the transporting unit to be covered with food, when a heating mechanism is provided under the transporting unit, which would result in insufficient convection of a heat mediating substance such as steam from the bottom side of the transporting unit to the top side of the transporting unit. The provided second height adjusting member can modify uneven heights by food moving to both sides in the width direction when passing the protrusions. With such a configuration, the height of food transported in the heating unit can be consistent, so that the food can be heated consistently. The shape of the first height adjusting member and the second height adjusting member is not limited to flat boards. Various shapes can be employed. Further, any number of first height adjusting members, protrusions, and second height adjusting members can be employed.

(Preprocessing Step)

In some embodiments, food subjected to the system of the invention may be washed and/or cut as needed. Thus, the method of the invention comprises a preprocessing step before a heating step in some embodiments. A preprocessing step consists of a step of washing and/or a step of cutting food. For washing and cutting food, a common method for vegetables, fruits, fish, or meat can be used without limitation.

In a certain embodiment, a preprocessing step is a step of washing food. When relatively large food is used, skin, seeds, bones and other nonedible portions are removed from the food, and the food is washed with water and cut in a suitable size and shape for the food. When relatively small food is used, the food is used in the next step without cutting. When food is vegetables, the vegetables can be cut in a shape similar to cut vegetables. Cherry tomatoes and strawberries only need to be washed with water, requiring no cutting. Radishes and carrots can be cut in a regular shape such as thinly shredded strips, short strips, or quarter circles or similarly cut smaller circles. For small vegetables such as bean sprouts, mushrooms, and mesclun greens, it is preferable to remove inedible portions, but there is no need to cut into smaller pieces. The order or frequency of washing and cutting is not particularly limited, as long as dust and dirt and inedible portions are complete removed and a suitable shape and size matching the food is attained after the preprocessing step. It is desirable to cut and wash in the shortest time possible for cost and freshness retention reasons.

The preprocessing step generally uses a washing apparatus using a shower or a water tank and a cutting apparatus using a cutter, grinder, sieve or the like. Washing apparatuses and cutting apparatuses that are commonly used in processing facilities of vegetables, fruits, mushrooms, fish, or meat can be used as such apparatuses. Food that has undergone the preprocessing step is sent to the aforementioned heating step.

(Adjustment Section)

The system of the invention may comprise an adjustment section between a heating unit and a cooling unit as needed. In a certain embodiment, an adjustment section is a portion between a heating unit and a cooling unit. Food does not stagnate, continuously moving through the adjustment section. In the adjustment section, a fan for blowing air to the exit of the heating unit is installed. The fan in the adjustment section is used to reduce the temperature and humidity in the heating unit in a short period of time. The fan in the adjustment section is managed in concert with automatic adjustment of the temperature and humidity inside the heating unit.

In a certain embodiment, an adjustment section is a general cooling unit. The general cooling unit is a portion configured to cool food on a transporting unit with outside air temperature. For example, when steam is used for heating, cooling food directly from a heating unit results in freezing of water droplets that have adhered on the food surface at the heating unit, which could damage cells of the food. For this reason, water droplets are allowed to evaporate at outside air temperature. When using clustered air with small particles that do not result in water droplets adhering to the food surface, it is not always necessary to have a general cooling section that allows food to be in contact with outside air temperature.

In another embodiment, various seasoning tanks can be provided in an adjustment section. Food with the surface to inside temperature in the range of 45° C. to 90° C. immediately after exiting the heating unit is immediately introduced into the seasoning tank to apply seasoning on the food surface. The heated food, to which seasoning is applied, is cooled in the cooling unit. During this process, the seasoning permeates to the inside of the food. When processed food obtained using the system of the invention is processed into dishes by applying heating such as simmering, baking, frying, or steaming, the seasoning step immediately prior to heating would not be required.

Seasoning is not limited, but liquid seasoning such as soy sauce, vinegar, sake, mirin, tare sauce, sauce, dressing, marinade, or pickle juice, a liquid food item such as broth, liquid seasoning comprising seasoning such as salt, sugar, miso or various flavorings, or any mixture thereof can be used. The temperature of seasoning may be room temperature. Although not wishing to be bound by any theory, seasoning adhering to food permeates to the inside of the food by applying the seasoning to the food that is heated and then rapidly cooling the food.

In one embodiment, seasoning is performed in a seasoning tank, which is inserted between a heating unit and a cooling unit and the inside thereof is isolated from outside air. Food is immediately loaded into the seasoning tank from the exit of the heating unit and immersed in seasoning in the seasoning tank. The food is then immediately loaded into the cooling unit.

Furthermore, various dishes and semi-prepared food items can also be produced by mixing various secondary ingredients with sterilized food in a seasoning step. Secondary ingredients are not limited, as long as they do not have any food hygiene issue. Examples of secondary ingredients that can be used include sesame seeds, walnuts, pine nuts, and other nuts, dried fish such as dried squid, smoked products such as salami, seaweed processed products such as nori, and the like. Seasoned food can also be covered with bread crumbs or tempura flour. Sterilized food can be utilized, by seasoning in this manner, as dishes that can be immediately consumed after opening or semi-prepared dishes with short cooking time.

(Unloading Section)

The system of the invention may comprise an unloading section at the exit of a cooling unit as needed. In one embodiment, an unloading section comprises a function of packaging food. Examples of packaging materials include, but are not particularly limited to, plastic bags, cups, boxes, and the like. The mechanism of packaging food is well known in the art. Those skilled in the art can select and utilize a suitable packaging mechanism in accordance with the food to be processed using the system of the invention.

In a certain embodiment, an unloading section comprises a function of mixing food with other food, seasoning and/or edible covering ingredient. For such mixing, a mixer that is commonly used in food item processing can be used without limitation. Such a mixing mechanism is well known in the art. Those skilled in the art can select and utilize a suitable mixing mechanism in accordance with the food to be processed using the system of the invention.

In one embodiment of the system of the invention comprising an unloading section, food exits a cooling unit and arrives at the unloading section. At the unloading section, processing is applied in accordance with the type of processed food to be produced. In a certain embodiment, when refrigerated food is produced in the system of the invention, food is packaged while maintaining the refrigeration temperature at an unloading section, and is transferred to a storage or transport step as refrigerated food. In another embodiment, when frozen food items are produced using the system of the invention, food is packaged while maintaining the freezing temperature at an unloading section, and is transferred to the storage or transport step as frozen food.

Prior to packaging, the aforementioned processed food that has arrived at the unloading section can be mixed with another food. Another food may be any different type of food that is similarly processed by the system of the invention. Such food can be used together. For example, processed cut vegetables that have arrived at the unloading section can be mixed with flakes of dried goods or smoked products. For such a mixture, a mixer that is commonly used in food item processing can be used without limitation.

Prior to packaging, seasoning and/or edible covering ingredient can be applied to the aforementioned processed food that has arrived at the unloading section. As such seasoning, dressing, mayonnaise, ingredients for aemono including sesame seeds and miso, coleslaw seasoning, kimchi sauce, marinade, pickle juice, carpaccio sauce or the like can be used. Such seasoning and processed food are mixed to complete various dishes such as various salads, asazuke, marinated dishes, and aemono. Further, covering ingredient for fried food (so-called batter coating) such as breadcrumbs, deep-frying powder, potato starch, or dessert powder can be mixed with food to obtain semi-prepared food for fried food. Secondary ingredients such as green laver or parsley powder can also be added to the batter coating for fried food.

In some embodiments, food is packaged, stored, and shipped after processing at an unloading section as refrigerated or frozen food items that can be directly consumed such as takeout dishes, frozen cut fruits, frozen cut vegetables, or salad vegetables sets or as refrigerated or frozen food items that are consumed after final heating such as additional baking, simmering, frying, or steaming.

(Product Preparation Step)

In some embodiments, the method of the invention may comprise, as needed, a product preparation step comprising a step of mixing food that has undergone a cooling step with another food, seasoning and/or edible covering ingredient and/or a packaging step.

For example, in a certain embodiment, a product preparation step is a step of mixing food that has undergone a cooling step with another food. Another food may be either food of a different type that has undergone the aforementioned step of the invention or food that has been separately prepared, or they may be used concurrently. For example, several types of food, which are prepared by the step of the invention in multiple lines and have undergone the cooling step, can be gathered and mixed in the product preparation step. Separately prepared cooked fish and shellfish, meat, dried goods, or smoked products can also be added to the food that has undergone the cooling step.

For example, in another embodiment, a product preparation step is a step of mixing food that has undergone a cooling step with seasoning and/or edible covering ingredient. As the seasoning, dressing, mayonnaise, or aemono ingredients including sesame seeds and miso, which are generally seasonings that are added immediately prior to consumption, can be used. Alternatively, coleslaw seasoning, kimchi sauce, pickle juice or the like can also be used. Covering ingredient for fried food (so-called batter coating) such as breadcrumbs, deep-frying powder, potato starch, or dessert powder can be mixed with food to obtain semi-prepared food for fried food. Secondary ingredients such as green layer or parsley powder can also be added to the batter coating for fried food.

For example, in another embodiment, a packaging step can be provided after a cooling step. In the packaging step, food that is continuously discharged from a freezer by transporting means is separated into a cup, bag, box, or the like using packaging equipment while being isolated from outside air and is packed in a manner that is suitable for shipping. Packed food is immediately stored in a refrigerated or frozen state as needed and shipped.

For example, in a certain embodiment, food that has undergone a step of being mixed with another food and/or a step of being mixed with seasoning and/or edible coating ingredient is immediately packaged, packed, shipped and transported as a processed food product. Plastic bags, cups, boxes and the like are preferred packaging materials. Containers that are highly transparent are preferred for high visibility of food through the container.

PREFERRED EMBODIMENTS

The present invention provides a food processing system comprising a heating unit for heating food, a cooling unit for cooling food that has been heated by the heating unit, and a transporting unit for transporting the food through the heating unit and the cooling unit. For example, FIG. 1A (plane view) and FIG. 1B (front view) are schematic diagrams showing an embodiment of the system of the invention. Food can be processed with a heating unit (200) and a cooling unit (300) while the food is being moved by a transporting unit (600).

For example, another embodiment of the present invention provides a method of producing processed food using the food processing system of the invention. FIG. 2 is a schematic diagram showing the method of producing processed food of the invention. The method of producing processed food of the invention optionally comprises a preprocessing step (101) and comprises a heating step (201) and a cooling step (301).

In a preferred embodiment, a heat mediating substance such as steam is ejected downwards from a heating mechanism provided under a transporting unit to generate convection, with a boat-shaped bottom section (FIG. 3). When the aforementioned transporting unit has a through hole (e.g., meshed conveyor belt) and/or a container used in transport is ventilated, a heat mediating substance passes through them for convection, thus overcoming variability in the temperature of a heating unit, while heat can be applied to a wide contact area on food so that the food can be heated quickly to a desired temperature without using a high temperature.

In a certain embodiment, the direction of ejecting a heat mediating substance such as steam from a heating mechanism can be a direction that forms a 0° to 90° angle with respect to the vertically downward direction. In a preferred embodiment, the direction of ejecting a heat mediating substance from a heating mechanism can be a direction that forms a 0° to 75° angle with respect to the vertically downward direction. In another preferred embodiment, the direction of ejecting a heat mediating substance from a heating mechanism can be a direction that forms a 0° to 45° angle with respect to the vertically downward direction. In a preferred embodiment, the temperature in the vicinity of a transporting unit through which food passes can be maintained to be consistent and the food can pass through a region whose temperature is maintained to be consistent by ejecting a heat mediating substance such as steam downwards from a heating mechanism and blowing air not towards the food with an air blowing mechanism. The above configuration enables consistent heating of a large quantity of food at the intermediate temperature zone, relative to, for example, a case where food is directly heated by a heat source such as steam from the heating mechanism or relative to food processing that leaves the food in a heating chamber that is filled with steam in the entire heating chamber for a certain amount of time. Since it is difficult to control the intermediate temperature zone, it was unexpected in the art that such a large quantity of food can be consistently processed in the intermediate temperature zone.

In a preferred embodiment, more heat mediating substance is ejected from a heat mediating substance ejection port near the feeding entrance of a heating unit (e.g., steam ejection port) compared to a heat mediating substance ejection port near the exit of the heating unit. With this configuration, the temperature of the fed food can be quickly raised to the temperature of interest.

In a preferred embodiment, multiple heating mechanisms are provided under a transporting unit. In addition, more heat mediating substance is ejected from a heating mechanism near the feeding entrance of a heating unit compared to a heating mechanism near the exit of the heating unit. Further, the direction of ejection of a heat mediating substance is downwards. Convection of the heat mediating substance is generated by the boat-shaped bottom section, while penetrating the transporting unit (FIG. 3). With this configuration, the temperature of the fed food can be quickly raised to the temperature of interest while materializing indirect and stable heating.

A heating unit and a cooling unit are preferably coupled by the transporting unit to be provided as an integrated system. In a certain embodiment, the food processing system of the invention is characterized by a heating unit and a cooling unit being coupled by a transporting unit. Once the food is heated, cells naturally deteriorate when left alone. In addition, in the process of the food temperature decreasing from a temperature with a sterilizing effect to a temperature at or below room temperature, the temperature passes through a temperature zone where microbes readily proliferate (e.g., about 20 to 40° C.). Thus, a sufficient sterilizing effect is not attained unless the food is quickly cooled to, for example, the chilled zone (e.g., about 2° C.). When cooling slowly, the time during which food is in a temperature zone where microbes readily proliferate would be longer. Thus, rapid cooling is required to shorten the time in the temperature zone where microbes readily proliferate.

A large quantity can be processed with a consistent effect in a short period of time by performing uniform processing in a line as a method of integrating a heating step and a cooling step. Thus, cost associated with a method that is currently utilized in the art for imparting a desired property in food can be drastically reduced.

For example, when the present invention is utilized as a sterilization method, the food surface is quickly cooled after being sterilized by a heating step so that the food surface is hardly exposed to a temperature zone where there is generally a risk of microbe proliferation in food, i.e., temperature region of about 20° C. to 40° C., or to outside air. As of the end of the cooling step, the number of microbes that may be adhering to the food surface is reduced to a level with no issue in terms of food sanitation, and sterilization that is generally required for food items is completed. Thus, if a food item that has completed the heating step and the cooling step are subsequently packaged, stored, transported, and sold under an atmosphere with no microbe proliferation, the food surface that has been cleaned in a heating unit is maintained in the same condition.

In some embodiments, the system of the invention may further comprise, for example, another portion disclosed below. Further, in some embodiments, the method of the invention may further comprise another step disclosed below. In some embodiments, an additional step of the method of the invention is a method using another portion of the system of the invention disclosed below.

For example, FIG. 4 is a schematic diagram showing another embodiment of the method of the invention (101: preprocessing step, 201: heating step, 401: seasoning step, 301: cooling step, 501: product preparation step (mix with another food), 502: product preparation step (mix with seasoning), 800: another food, 503: product preparation step (packaging step)). The method of the invention may optionally comprise such a step in addition to heating and cooling steps.

The features of the present invention disclosed herein may be comprised in any combination and in any arrangement or order, as long as the advantageous effect of the invention is not impaired. The present invention can also be practiced while adding various modifications that are evident to those skilled in the art.

For example, in a certain embodiment, the present invention is a food processing system comprising: a heating unit comprising a heating mechanism for indirectly heating food; a cooling unit comprising a cooling mechanism for cooling the food that has been heated by the heating unit; and a transporting unit for transporting the food through the heating unit and the cooling unit.

For example, in another embodiment, the present invention is a food processing system comprising a heating unit comprising a heating mechanism for indirectly heating food and an air blowing mechanism that is a fan, a cooling unit comprising a cooling mechanism for cooling the food that has been heated by the heating unit, and a transporting unit for transporting the food through the heating unit and the cooling unit, further comprising a loading section at one end of the transporting unit and a packaging apparatus at the opposite end. Such an embodiment of the system of the invention is shown as a schematic diagram in FIG. 7A (plane view) and FIG. 7B (front view).

Further, the system of the invention is not particularly limited in terms of its scale. In a certain embodiment, the entire length of a heating unit, adjustment section, and cooling unit is 15 m, with processing taking about 6 to about 7 minutes. However, the scale of a system can be altered in accordance with food to be processed or the objective of processing. For example, it takes at least about 1.5 minutes to pass through a heating unit when the heating unit is of a certain size, but this can be shortened to at least about one minute by shortening the length of the heating unit. In a certain embodiment, the length of an adjustment section is 1.5 m, and the time it takes food to pass through is about 40 seconds.

In a certain embodiment, processed food items of interest are obtained by processing various foods over a total of 3 to 10 minutes, and preferably 5 to 8 minutes, with the system of the invention having the aforementioned feeding section to the unloading section. The scale of the site and mechanism of the aforementioned feeding section to the unloading section can be freely expanded or contracted depending on the amount of food to be processed per unit time.

The food processing method of the invention preferably performs each step continuously in a single line. For example, when the food processing method of the invention is performed with steps consisting of the essential steps, i.e., preprocessing step, heating step, and cooling step, the preprocessing step, the heating step, and the cooling step are preferably continuously performed in this order in a single line. When any of one or more of the aforementioned seasoning step and product preparation step is provided in addition to the preprocessing step, heating step, and cooling step, the food processing method of the invention preferably performs each step continuously in a single line.

Preferably, all steps are continuously performed without stopping the movement of food upon transition to each step in the same line by using a conveyor belt, automatic loading and unloading apparatus, a mixer, or the like. It is preferable that all steps are completed in the shortest period of time possible.

In some certain embodiments, the present invention provides a food sterilization system. For example, the food sterilization system of the invention is a food sterilization system comprising a steam heater, a freezer, and a food transporting means, wherein the steam heater has a section for introducing washed and cut food at an end section thereof, the internal temperature thereof being maintained at a temperature in the range of 45° C. to 90° C., a fan for blowing air on the surface of the food being provided inside thereof, and the food transporting means penetrating the inside thereof, and wherein the freezer has an entrance for introducing food that has been heated with the steam heater at an end section thereof, the internal temperature thereof being maintained at a temperature in the range of −10° C. to −40° C. and the food transporting means penetrating the inside thereof. The aforementioned heating step and the cooling step can be performed on a continuous line with such a sterilization system.

Once washed and cut food is mounted on the transporting means to introduce the food into the sterilization system of the invention, sterilized food can be retrieved continuously with substantially automated operation without replacing food. The sterilization system of the invention can allot one line in operation to one type of food or to a combination of one types of food. Switching food or changing the amount of food can be flexibly handled by adjusting the operation time or the number of lines.

Application of the Present Invention

For example, food, especially vegetables, sea vegetables, mushrooms, or fruits can be subjected to processing in a preprocessing step, heating step, and cooling step in this order to obtain processed products of vegetables, sea vegetables, mushroom, or fruit with mouthfeel or taste that is equivalent or better than that prior to processing, or with preferable mouthfeel or taste without harshness or unpleasant taste of food prior to processing, with excellent preservability. Sensory tests have confirmed that an umami component contained in mushrooms increases when mushrooms in particular are processed.

Harshness in taste is completely removed with the processing method of the invention, even for traditional spinach that has grown to 45 to 60 cm which has been considered to have strong harshness in taste and thus low product value. For this reason, spinach that has been disposed of for having strong harshness in taste from too much growth can be utilized effectively without waste, resulting in cost reduction. With the processing method of the invention, mouthfeel is simultaneously enhanced for almost all parts of spinach, i.e., leaf, stem, and boundary portion of the stem. Thus, almost the entire plant can be deemed edible, so that yield in processing is enhanced.

Such processed products of vegetables, sea vegetables, mushrooms, and fruits are ground-breaking food items that can replace conventional cut vegetables and cut fruits. In addition, such processed products can be used in industrial or home cooking as semi-prepared food items. Since cooking time for such semi-prepared food items obtained in the present Invention is shorter than that for conventional products, they can be used as the so-called "fast cooked food". When using root vegetables in particular which require relatively long cooking time, such semi-prepared food items are useful.

Although not wishing to be bound by any theory, processed food that has been processed using the food processing system of the invention is processed food with cells that are not destroyed, so that there is an advantage, when seasoning or other step is performed (cooking) in the next processing stage, in being able to cook all ingredients together regardless of the cooking procedure. Specifically, simply using processed food not only reduces the time required for cooking, but also is capable of drastically reducing labor-intensiveness of industrial and home cooking by enabling simultaneously cooking multiple foods that conventionally required different heating processes. Thus, this contributes to reduced cost in providing a processed food item.

When fish or meat in particular is used as food and processing is performed with a preprocessing step, heating step, and cooling step in this order, proteins contained in the food are suitably thermally denatured, resulting in fish or meat processed products with excellent preservability and unique mouthfeel. Such fish or meat processed products according to the present invention are ground-breaking food items that can replace conventional fish or meat for raw consumption. Such semi-prepared food items obtained with the present invention are also highly likely to be accepted in countries that lack the custom to consume raw fish or meat.

When food is ultimately seasoned to prepare a seasoned food item from the processed food item of the invention, a seasoning step is added. Dishes such as deep-fried food, tempura, and meuniere can be readily prepared simply by heating the processed food item of the invention with an added seasoning step. When the processed food item of the invention is used to prepare such a dish, a surprising advantage of reducing deterioration of cooking oil has also been reported.

A variety of food can be used to produce diverse processed food items by using the food processing method of the invention with the aforementioned steps. The final resulting processed food would be highly nutritious food having both mouthfeel of fresh food and taste that is not present in raw food or food items obtained by a common heating method. Consumers can directly use the processed food of the invention or add a finishing touch to the processed food of the invention with a simple cooking process. The processed food of the invention can be used to provide, for example, highly popular processed food items shown in the pictures of each drawing, i.e., dishes such as marinated vegetables and seafood (FIG. 8), coleslaw (FIG. 9), vegetables with salted kelp (FIG. 10), vegetables seasoned with salt-based sauce (FIG. 11), bean sprouts with ponzu and lightly pickled vegetables (FIG. 12), and the like.

In some embodiments of the present invention, food heated to 45° C. to 90° C. in a heating unit immediately enters a cooling unit to be cooled in a short period of time to the so-called chilled state. During such processing, the period during which the food is exposed to an atmosphere where microbes readily proliferate is very short or hardly exists. Thus, sanitary processed food that is aseptic or in a state close thereto is obtained at an unloading section. Such processed food can be sanitarily stored significantly longer in a refrigerated state, compared to fresh food, without sterilization with a chemical agent or physical processing as in fresh food.

The system of the invention does not apply chemical processing with a processing agent such as a water retaining agent or a thickener, or physical processing such as compression or pressing, but instead simply processes food under a relatively moderate condition in a heating unit. However, the food quality surprisingly improves by such heating. First, the temperature is maintained at 45° C. to 90° C. for a certain amount of time in the heating unit to inactivate enzymes contained in fruits and vegetables and suppress self-deterioration/self-degradation of food. For this reason, fruits and vegetables that have been processed with the system of the invention maintain excellent mouthfeel and suppress discoloration, deformation, and outflow of fruit and vegetable juice, even when stored at room temperature for several days or longer. In contrast, room temperature storage of commercially available fresh fruits and vegetables for several days tends to result in discoloration, deformation, and outflow of fruit and vegetable juice, so that the fruits and vegetables would no longer be suitable for raw consumption.

In this manner, the food item processing system of the invention suppresses outflow of food content or drying of food items. Thus, yield from raw material food to final processed food items is high. Compared to conventional production of dishes or dried vegetables that have been cooked at a high temperature using hot water or hot air, processed food items obtained at an unloading section of the system of the invention have been empirically revealed as having improvement in yield from raw material food to final processed food items by 10% or more.

Tissue of fresh food does not deteriorate while maintaining the hardness or softness unique to the fresh food by processing the food at a relatively low temperature in a heating unit. It is noteworthy that an unpleasant taste component (so-called harshness) contained in food is eliminated by the processing at the heating unit. For this reason, when the food is fruits and vegetables that can be consumed raw, fresh processed vegetables with mouthfeel and rich taste of fresh vegetables are provided. Such processed vegetables have quality that is absent in conventional cut vegetables or cut fruits. When the food is seafood, mushrooms, or other food with abundant umami or fragrance, there is an effect of further enriching the umami or fragrance of the food or maintaining the smooth sensation of fresh food.

Vegetables and fruits and hard portions of mushrooms that were considered unsuited to cold dishes such as salads are also processed to be soft with excellent mouthfeel in the heating unit. For this reason, portions of food that were generally considered unsuited for cooking can also be utilized as ingredients of dishes. For example, vegetables that have been conventionally disposed of due to growing too much can also be utilized in dishes without wasting.

The drastic reduction in the time required for heating when food that has been processed by the system of the invention is prepared into various dishes by heating such as baking, simmering, frying, or steaming is a major advantage in food item processing. For example, when dishes such as fried chicken or pork cutlet are ultimately produced, frying time can be reduced to half the usual heating time or less, such as 0.5 minutes to 2 minutes, or typically 0.5 minutes to 1 minute, resulting in a highly economical effect of extending the life span of frying oil 3 to 5 fold when using food processed by the system of the invention.

The food item processing system of the invention can be operated almost fully automatically, requiring no high energy processing such as high temperature high pressure heating or microwave processing. For this reason, the system of the invention can be operated at a low cost.

The system of the invention comprises a function of performing heating and cooling steps at a constant rate. For this reason, processing that efficiently imparts an effect consistently to a large quantity of food can be performed. For example, in a certain embodiment, the system of the invention can process 10 tons of food in 8 hours of operation per day. The settings and/or configuration of the system of the invention can be altered to change the processed amount. For example, the processed amount can be altered by changing the settings for transport speed of transporting unit, the temperature of the heating unit, or the temperature of the cooling unit. For example, 30 tons of food can be processed in 8 hours of operation per day by expanding the feeding entrance 3-fold.

Furthermore, an embodiment using the present invention as a sterilization method also heats food in the range of 45° C. to 90° C. to the center portion in the heating step. Thus, enzymes inducing deterioration/ripening of food are inactivated inside the food. Since inactivated enzymes never reactivate, ripening/aging of food mostly stops upon applying the sterilization of the invention.

Heating in the heating step of the invention is much more moderate than normal heating, so that cells of food are never destroyed. With rapid cooling in the cooling step, food can be cooled without freezing the inside of the food. For this reason, the sterilization method of the invention can sterilize fresh food without impairing the hardness, resilience, or shape of fresh food. Food processed with the sterilization method of the invention in this manner is maintained in a sanitary state, with hardly any dripping of fluid, and without deformation or discoloration for a much longer period of time compared to unprocessed cut food.

In some embodiments, the present invention provides a ground-breaking method and apparatus that can sterilize food to the level without food hygiene issues by simple means of two-stage temperature management without using any washing water treatment apparatus, sterilizing agent or a large quantity of water, which had been considered essential for sterilization of food requiring freshness. Such a food sterilization method and resulting sterilized processed food of the invention can be readily understood by producers and consumers.

The operation of the sterilization system of the invention requires only a very small number of operators. Operational conditions of each part, such as the steam heater's internal temperature, internal humidity, volume of water passing through, amount of heat mediating substance such as steam released, the number of rotations of a fan, freezer temperature, or food transport speed can be monitored and adjusted at an administrative zone that is external to the apparatus. There is hardly any need for direct human manipulation of food or equipment. In the administrative zone, a difference between a pre-registered optimal value and actual measurement values continuously input is calculated and evaluated to automatically display a warning, adjust each condition, or the like. Thus, the sterilization system of the invention can be continuously operated for 24 hours with a very small number of operators. Moreover, the operation of the system of the invention does not require experienced operators. For this reason, a large quantity of food can be stably sterilized, regardless of the installation location of the system.

Surprisingly, harshness in taste of food can also be eliminated in the aforementioned heating step by raising the temperature, from the food item surface to the center portion, to a temperature of in the range of 45° C. to 90° C. while applying steam or the like to the food item surface. When the sterilization method of the invention is applied to, for example, vegetables such as spinach or burdock which is considered unsuited to raw consumption, their unique bitterness and unpleasant taste are eliminated while maintaining the hardness of spinach or burdock. Similarly, the unique bitterness and unpleasant taste of the skin of fruits can also be eliminated. As a result, food to which the sterilization method of the invention is applied consequently has preferred sweetness, sourness, or fragrance exhibited by unprocessed product, which is enhanced. In this manner, the sterilization method of the invention can enhance the preservability of food as well as improve the flavor of the food.

Furthermore, the system or method of the invention can maintain food in a fully ripe state by inactivating enzymes. Conventional distribution of vegetables (especially fruit vegetables) or fruits involved sale thereof as fully ripe food by harvesting the vegetables or fruits during growth so that the vegetables or fruits are ripe at the stage where a vendor presents the vegetables or fruits to consumers. Distribution of fresh products that have fully ripened in a natural state is highly exceptional, involving a high cost. Most products sold as fully ripe food were left to ripen simply by utilizing aging over time. The system or method of the invention can be utilized to maintain food that has fully ripened in a natural state in a fully ripe condition to distribute such food without high cost.

The food processing system of the invention is a groundbreaking system that can produce dishes with improved taste, cost, and preservability. The present invention can provide processed food items or takeout dishes with a "third taste" that is absent in food for raw consumption or heated food, which can stimulate and satisfy consumers' insatiable preferences. The present invention can be considered a revolutionary technique that can provide completely new business opportunities to the restaurant industry, retailers, and food catering services. Moreover, the system of the invention can produce processed food that is significantly improved in terms of food hygiene. Thus, the food yield is improved in processed food item industry in an unprecedented manner. For this reason, the system of the invention is expected to make significant contribution to the retail industry or restaurant industry that uses processed food or cooked food items.

One of the features of the present invention is in heating food at the intermediate temperature zone, which has a relatively low temperature of 45 to 90° C., in the heating step. The aforementioned heating condition has been avoided as "incomplete" processing in traditional cooking methods. For example, the exemplary model for heating has been to "thoroughly heat" or "simmer for smooth finish". In addition, "freshly picked" fruits and vegetables have been recommended for raw consumption. For fish and shellfish, processing that applies no heating such as "draining blood to keep freshness", "rapid cooling of thin slices", or "live serving" has been considered ideal. However, as shown in the following Examples, the aforementioned heating condition is considered to be a factor providing food a unique mouthfeel and taste, which are absent in heated food or food for raw consumption, in the processing method of the invention. The present invention achieved an unexpected outcome as a result of executing food processing manipulation that has been conventionally denied, while disregarding established ideas. The present invention is a groundbreaking technique that is founded on the so-called reverse thinking.

Food obtained with the food processing system of the invention maintains the characteristic of fresh food, has excellent taste or mouthfeel, is nutritionally excellent, and is highly convenient as being directly edible or cookable in a short period of time. Thus, contribution thereof to consumers is significant. The processed food of the invention is considered capable of overcoming various issues in terms of nutrition, oral cavity sanitation, and public health that have been raised with regard to modern life.

Furthermore, processed food obtained using the present invention can be utilized to use parts of food that have been considered inedible, and to shorten cooking time. Moreover, cost of cooking oil or utility expenses can be reduced. Such processed food of the invention makes significant contribution to the restaurant industry, food catering industry, takeout dish producing industry, retailers such as supermarkets and the like.

Processed food obtained using the present invention can enhance mouthfeel or taste of varieties/grades of food that have been considered unsuited for processing or sale. For this reason, it may become unnecessary to select varieties or manage cultivation, which has been strictly imposed on producers of vegetables, fruits, fish, meat, or the like, in order to meet the preference of consumers. For this reason, producers can mass produce food that can satisfy consumers at a lower cost than previously possible. In this manner, producers are expected to be able to produce products that can sufficiently compete against cheap imported food.

In this manner, the food processing method and processed food obtained by said method of the invention are groundbreaking techniques that can make contribution to each of consumers, processors, and producers of food. The present invention can affect the state of affairs of food item markets.

The present invention also provides a food sterilization method that can stably sterilize a large quantity of food at a low cost. Such a sterilization method of the invention can drastically lower food processing cost and the amount of disposed processed food. Such a system of the invention is expected to result in a revolutionary leap in the food processing industry.

Processed food processed by the system of the invention not only has food hygiene at a level that is not problematic, but also has only the preferred mouthfeel of fresh food in a condensed form. Such processed food obtained with the present invention can be utilized in a wide range of food items such as a salad ingredient that is used unprocessed or as an ingredient of various dishes. Such processed food with improved preservability and flavor is expected to be a product that is welcomed by consumers who demand food safety and simplification of cooking.

As a result, the present invention is expected to be able to improve the utilization efficiency of agricultural products. Specifically, substandard goods, excessive harvest, or fully ripe products that are not suitable for long-term storage, which have been disposed in the past, can be processed into a product that is preferred by consumers at a low cost. Thus, the present invention is notable as a ground-breaking food processing technique that is beneficial to each of agriculture, agricultural product processing industry, distribution industry, retailers, restaurants, and consumers.

EXAMPLES

Example 1

[Processing Example of Vegetables]

Commercially available fresh vegetables were washed and cut as needed. The mouthfeel of these vegetables that were heated using the food processing system of the invention and those that were not processed was compared. The results are shown in Table 1.

TABLE 1

| | | (2) Heating unit | | |
|---|---|---|---|---|
| Food | (1) Feeding section Food shape | Internal temperature (° C.) | Food passing time (minutes) | Evaluation |
| Cabbage | Width 7 mm | 70 | 3 | Mouthfeel close to raw, excellent texture |
| Cabbage | Width 7 mm | None | | Fibers felt hard; remain in mouth |
| Onion | Wedges | 70 | 5 | Excellent mouthfeel; some sweetness |
| Onion | Wedges | None | | Pungent flavor not eliminated; cannot be considered delicious |
| Bean sprout | Entire shape | 65 | 7 | Excellent mouthfeel and taste; outer appearance no different from raw bean sprout |
| Bean sprout | Entire shape | None | | Harshness in taste not eliminated; cannot be considered delicious |
| Spinach | Cut into chunks | 60 | 2 | No harshness in taste; fresh sensation |
| Spinach | Cut into chunks | None | | Strong bitterness due to harshness in taste; not suitable for eating |

As shown in Table 1, vegetables processed with the system of the invention have improved taste while maintaining texture or outer appearance that is unique to fresh vegetables.

Example 2

[Processed Vegetables and Evaluation Thereof]

(1) Processing

Cabbage, nappa cabbage, onion, bean sprout, spinach, cucumber, shimeji, potato, burdock, lotus root, tomato, and cherry tomato were used as food. (Preprocessing step) Each food was washed with water and cut into a predetermined shape as shown in Tables 2 and 3. (Heating step) Subsequent to the preprocessing step, each food was steamed and heated under the conditions shown in Tables 2 and 3. (Cooling step) Each food that has undergone the heating step was cooled for 2 minutes in a tunnel freezer whose internal temperature was maintained at 20° C.

(2) Evaluation

Each food after cooling was sampled without seasoning. The taste and mouthfeel were evaluated using the following 4 levels. The results of evaluation are shown in Tables 2 and 3.

Judgment A: especially good. B: good. C: bad. D: especially bad.

Each food in (1) was processed with an altered steam-heating condition and was evaluated as in (2). The conditions and results are shown in Tables 2 and 3.

TABLE 2

| | | Step 3 | | | |
|---|---|---|---|---|---|
| | Step 1 | Heating temperature | Heating time | Evaluation | |
| Food | Shape | (° C.) | (min) | Rank | Comment |
| Cabbage | Cut into chunks | 75 | 4 | A | Excellent mouthfeel with sweetness |
| Cabbage | Cut into chunks | 70 | 5 | B | Somewhat hard, but has sweetness |
| Cabbage | Width 7 mm | 70 | 3 | A | Mouthfeel close to raw; excellent texture |
| Cabbage | Width 7 mm | 70 | 2 | C | Fiber feels hard |
| Nappa cabbage | Cut into chunks | 75 | 5 | B | Excellent mouthfeel and taste, but slight tendency for moisture to seep out |
| Nappa cabbage | Cut into chunks | 70 | 4 | A | Excellent mouthfeel with sweetness. |
| Onion | Wedge | 70 | 5 | A | Excellent mouthfeel with sweetness |
| Onion | Wedge | 70 | 3 | C | Pungent flavor not eliminated |
| Bean sprout | Entire shape | 70 | 5 | B | Mouthfeel and taste are excellent, but change in outer appearance |
| Bean sprout | Entire shape | 65 | 7 | A | Excellent mouthfeel and taste; no difference in outer appearance from raw bean sprout |
| Bean sprout | Entire shape | 65 | 3 | D | Harshness in taste not eliminated |

TABLE 2-continued

| Food | Step 1 Shape | Step 3 Heating temperature (° C.) | Step 3 Heating time (min) | Rank | Evaluation Comment |
|---|---|---|---|---|---|
| Spinach | Cut into chunks | 65 | 2 | C | Harshness in taste eliminated with excellent taste, but fresh sensation is lost |
| Spinach | Cut into chunks | 60 | 2 | A | No harshness in taste with fresh sensation |
| Spinach | Cut into chunks | 60 | 1 | D | Harshness in taste not eliminated; not suitable for consumption |

TABLE 3

| Food | Step 1 Shape | Step 3 Heating temperature (° C.) | Step 3 Heating time (min) | Rank | Evaluation Comment |
|---|---|---|---|---|---|
| Cucumber | Stick | 70 | 3 | B | Excellent mouthfeel and taste, but change in outer appearance of surface |
| Cucumber | Stick | 65 | 3 | B | Excellent mouthfeel and taste, but sterilization may not be sufficient |
| Shimeji | Separate | 70 | 3 | A | Excellent mouthfeel and taste; very delicious |
| Shimeji | Separate | 70 | 5 | B | Excellent taste, but excessive moisture |
| Potato | Stick | 70 | 5 | C | Harshness in taste not eliminated, and partially discolored |
| Potato | Stick | 80 | 5 | A | Excellent taste with no discoloration |
| Burdock | Stick | 90 | 6 | A | Excellent taste with no discoloration |
| Burdock | Stick | 75 | 6 | D | Harshness in taste not eliminated; not suitable for consumption |
| Lotus root | Width 5 mm | 70 | 5 | A | Extremely good taste with sweetness; no discoloration |
| Lotus root | Width 5 mm | 65 | 5 | C | No sweetness |
| Tomato | Entire shape | 52 | 6 | A | Delicious without unpleasant taste unique to tomatoes; no deterioration on section, while maintaining quality over days |
| Tomato | Entire shape | Not heated | 0 | D | Has unpleasant taste unique to tomatoes, with early deterioration of section |
| Cherry tomato | Entire shape | 50 | 2 | A | No unpleasant taste or harshness in taste; lots of moisture even after 2 weeks from processing |
| Cherry tomato | Entire shape | Not heated | 0 | D | Has unpleasant taste and harshness in taste; moisture decreased to ⅓ after 2 weeks from processing |

[Comparison of Processed and Unprocessed Tomatoes]

One of two tomatoes immediately after harvest was processed under the aforementioned conditions. The other tomato was not processed. The processed tomato and the unprocessed tomato were left standing for 4 days at room temperature. Each of the tomatoes was then cut in half to compare the section. Pictures thereof are shown in FIG. 13 (processed product) and FIG. 14 (unprocessed product). It can be understood that tomato cells are not destroyed in the processed product, with deterioration minimized throughout the entire tomato.

[Comparison of Processed and Unprocessed Cherry Tomatoes]

One of two cherry tomatoes immediately after harvest was processed under the aforementioned conditions. The other cherry tomato was not processed. The processed cherry tomato and the unprocessed cherry tomato were left standing for 4 days at room temperature. Each of the cherry tomatoes was then crushed with a fork to compare the amount of juice. The pictures thereof are shown in FIG. 15 (processed product) and FIG. 16 (unprocessed product). It can be understood that moisture is not lost in the processed product, maintaining a fresh state.

In view of the aforementioned results, it can be understood that the food processing method of the invention improves the taste or mouthfeel of food, while maintaining freshness of the food. The processed food item of the invention is a ground-breaking food item with both the advantage of fresh food and the advantage of heated food.

Example 3

[Additional Processing Example of Food]

Other examples of combinations of conditions yielding processed food with excellent mouthfeel and taste using the system of the invention include the following (Table 4).

TABLE 4-1

| Name of product | Specification | Heating temperature | Heating time | Evaluation |
|---|---|---|---|---|
| Cauliflower | Separate | 75° C. | 3 min | Excellent taste with no discoloration |
| Broccoli | Separate | 70° C. | 3 min | Good mouthfeel as salad vegetables |
| Carrot | 3 mm | 70° C. | 3 min | Good mouthfeel as salad vegetables |
| Paprika | Cut into chunks | 60° C. | 3 min | Good mouthfeel with no harshness in taste |
| Cumquat | Entire shape | 55° C. | 3 min | Harshness in taste completely eliminated; strong sweetness |
| Nameko | Separate | 80° C. | 3 min | Very strong fragrance of nameko |
| Pineapple | 2 cm round slice | 55° C. | 3 min | Harshness in taste eliminated; little discoloration or drip |
| Grape | Separate | 60° C. | 2 min | Little harshness in taste remains, but good balance with mouthfeel |
| Kiwi | Separate | 55° C. | 3 min | Piercing stimulation on tongue eliminated; good dripping and surface condition after slicing |
| Melon | Separate | 55° C. | 4 min | Grassy smell near the skin eliminated; very sweet |
| Watermelon | ½ cut | 55° C. | 4 min | Grassy smell near the skin eliminated; very sweet |

TABLE 4-2

| | | | | |
|---|---|---|---|---|
| Shrimp | 1 | 75° C. | 4 min | Good taste and mouthfeel; harshness in taste also completely eliminated |
| Octopus leg | 1 | 80° C. | 8 min | Coloration starts; soft mouthfeel |
| Squid tentacle | 1 | 80° C. | 8 min | Coloration starts; soft mouthfeel |
| Fatty pork | 3 mm | 75° C. | 6 min | Meat is soft; no fatty smell |
| Pork liver | Thin slice | 75° C. | 4 min | No bad odor; yield is almost 100% |
| Chicken skin | Thin slice | 80° C. | 4 min | No bad odor; so soft it is unlike chicken skin |
| Chicken gizzard | Thin slice | 75° C. | 4 min | No bad odor; very soft |

Example 4

[Production Example of Prepared Food Item]

As disclosed below, a variety of food was processed with the system of the invention, and mouthfeel was evaluated as is, or after cooking. In both cases, the system of the invention was used. Food was heated over 3 to minutes with a (2) heating unit (steamer), which was maintained at an internal temperature of 70-75° C. and was filled with misty steam, and was cooled with a (3) cooling unit (tunnel freezer) over 2 and a half to 3 minutes until the temperature of the center portion of the food was 2° C. The resulting processed food was returned to room temperature, and then sampled or used in the next preparation.

[Production of Mushroom Salad]

The hard tip of commercially available enokitake was removed, and the rest was processed with the system of the invention. Bottled seasoning for enokitake was applied to the processed enokitake to make mushroom salad. The processed enokitake was smoother and softer than fresh enokitake and had increased fragrance of mushrooms. Attractive mouthfeel and fragrance that are absent in bottled enokitake was able to be enjoyed.

[Processing of Stripped King Crab Meat]

Stripped king crab meat was processed with the system of the invention. Strong sweetness and umami were felt. There was no crab meat fiber as in steamed crab meat or boiled crab meat, while having smooth mouthfeel. Stickiness of fishy smell unique to fresh products was not found. Rare mouthfeel that is absent in heated crab meat can be enjoyed with crab meat for raw consumption.

[Production of Deep Fried Chicken]

The system of the invention was used to process chicken meat that was cut into bite sizes. However, the chicken meat was immersed in soy sauce and sake based seasoning at the adjustment section. The resulting processed chicken meat was fried with oil to make deep fried chicken. The time required for frying was about 1 minute. The resulting deep fried chicken was resilient and juicy, and the taste consistently penetrated to the center portion of the meat. Oil was cleaner than usual, so that the period until oil replacement was needed was extended 5 fold.

[Production of Pork Cutlet]

The system of the invention was used to process pork fillet that was cut into bite size. The resulting processed pork fillet was covered with normal batter for pork cutlet and fried in oil to make pork cutlet. The time required for frying was about 1 minute. The resulting pork cutlet was resilient and juicy, without the dry sensation unique to fillets. Oil was cleaner than usual, so that the period until oil replacement was needed was extended 5 fold.

[Production of Diced Steak]

The system of the invention was used to process beef thigh meat that was cut into a bite-sized dice shape. The resulting processed beef was cooked on a frying pan. The time required for cooking was about 1 minute. The resulting diced steak was resilient and juicy, with a sirloin steak-like taste.

Example 5

[Production Example of Salad Kimchi]

In processing line 1, nappa cabbage was washed and cut. The nappa cabbage was heated with steam for 4 minutes at a heating unit maintained at 70° C., and was cooled for 2 minutes in a refrigerator with an internal temperature of −20° C. Simultaneously in processing line 2, bean sprouts were washed, and then heated with steam for 7 minutes at a heating unit maintained at 65° C. and cooled for 2 minutes in a refrigerator with an internal temperature of −20° C. The cooled nappa cabbage from processing line 1 was mixed with the cooled bean sprouts from processing line 2. Kimchi sauce was added to the mixture and stirred. Salad kimchi of nappa cabbage and bean sprouts was prepared in this manner.

[Sanitary Inspection of Salad Kimchi]

Salad kimchi obtained by the aforementioned method was stored at 4° C. Salad kimchi immediately after preparation, and salad kimchi that has been stored for 7, 14, 21, and 28 days were inspected for the live common bacteria and *E. coli* count by a method using petrifilm. The results are shown in Table 5. In view of the results in Table 5, it can be understood that salad kimchi can be preserved for a long period of time in a condition without sanitary issues. Common kimchi salad sold at stores must be disposed of in about a week. However, as shown in Table 5, kimchee salad using the system of the invention is in a sanitarily safe condition for 3 weeks or longer. According to conventional sterilization methods using hypochlorous acid, live common bacteria count immediately after sterilization is $1\times10^3$ to $1\times10^4$ cfu/g, and this is $1\times10^5$ to $1\times10^6$ cfu/g after 3 to 4 days. Considering the above, it can be understood that the food processing method of the invention also has sterilizing function in view of the test results in Table 5. The processed food item of the invention is a ground-breaking food item with excellent safety.

TABLE 5

|  | Immediately after preparation (day 0) | Day 7 | Day 14 | Day 21 | Day 28 |
|---|---|---|---|---|---|
| Live common bacteria count ($\times 10^3$ cfu/g (mL)) | 1.5 | 1.8 | 1.0 | 1.0 | 1.3 |
| *E. coli* count ($\times 10^3$ cfu/g (mL)) | Negative (less than 10) | Negative (less than 10) | Negative (less than 10) | Negative (less than 10) | Negative (less than 10) |

Example 6

[Preservability of Additional Processed Food]

The preservability of processed food produced with the system of the invention is further demonstrated hereinafter.

[Sterilization of Carrots]

10 kg of shredded carrots were heated for 5 minutes in a heating unit with an internal temperature maintained at 70° C. while being transported on a conveyor belt and were subsequently cooled to a chilled state (0° C. to 1° C.) by having the carrots pass through a cooling unit (tunnel freezer) for 2 minutes. The carrots were then taken out from the tunnel freezer. When the sterilized carrots were sampled, there was no difference in the hardness and resilience from raw shredded carrots (not sterilized), but sweetness was improved.

The carrots taken out of the tunnel freezer were separated into a plastic bag and sealed under a cleanroom environment. The bags of carrots were stored at 10° C. 10 days after starting storage, the plastic bags were opened. The carrot surface was measured for the live common bacteria count and *E. coli* count by a method using a petrifilm with respect to a washing solution. The live common bacteria count was $1.1\times10^4$ cfu/g (mL), and the *E. coli* count was negative (less than 10). This result satisfied the standard requirement for frozen food items consumed without heating, i.e., live common bacteria count of $1.0\times10^5$ cfu/g (mL) or less and *E. coli* negative. Further, dripping, deformation, and discoloration were hardly observed upon opening.

[Sterilization of Cabbage]

The same procedure was performed by replacing the shredded carrots in the above example with shredded cabbage. When sterilized cabbage was sampled, there was no difference in hardness and resilience from raw shredded cabbage, but harshness in taste sensed in raw shredded cabbage was reduced. The live common bacteria count 10 days after sterilization was $0.67\times10^4$ cfu/g (mL) and the *E. coli* count was negative (less than 10). This result satisfied the aforementioned standard requirement for frozen food items consumed without heating. Dripping, deformation, and discoloration were hardly observed upon opening.

[Sterilization of Shimeji]

The same procedure was performed after changing the shredded carrots in the above example with shimeji. Shimeji that has had a hard tip removed, a bunch thereof loosened, and lightly washed was used. When sterilized shimeji was sampled, fragrance unique to shimeji was enhanced. Suitable hardness and resilience were also felt. The live common bacteria count after 10 days from sterilization was $0.3\times10^4$ cfu/g (mL) and *E. coli* count was negative (less than 10). The results satisfied the above-described standard requirement for frozen food items that are consumed without heating. Dripping, deformation, and discoloration were hardly observed upon opening.

In contrast, current products called cut vegetables or cut fruits lost product value with advanced dripping, deformation, or discoloration within 2 or 3 days after shipping. The period during which these products can be sold at stores or used at restaurants is only 1-2 days after receiving the products.

{Sterilization of Green Onions]

Green onions were used as the food. The green onions were processed, with 1.5 minutes of heating at a temperature of 70 to 75° C. and about 2 to 3 minutes of cooling. The results of tests on sterilization of green onions (Bureau Veritas Japan) are shown in the following Table 6. Surprisingly, the *E. coli* count was negative and the live common bacteria count was less than 300 cfu/g immediately after processing. For a common sterilization method using an agent (hypochlorous acid or ozone), the minimum count is $10^4$ cfu/g (mL) immediately after the processing stage, so that it is almost impossible to stably produce food at $10^4$ cfu/g (mL). Thus, the excellent sterilizing function of the present invention, which reduces the live common bacteria count to less than 300 cfu/g, has been clearly demonstrated. Even in storage at 10° C., the *E. coli* count maintains negative count up to day 7, demonstrating the excellent preservability of green onions processed by the system of the invention.

TABLE 6

Results of sterilization of green onions.

| Storage conditions | Live common bacteria count (cfu/g) | *E. coli* count (cfu/g) |
|---|---|---|
| Storage at 10° C., at start | Less than 300 | Negative (less than 10) |

TABLE 6-continued

Results of sterilization of green onions.

| Storage conditions | Live common bacteria count (cfu/g) | E. coli count (cfu/g) |
|---|---|---|
| Storage at 10° C., day 3 | $6.0 \times 10^2$ | Negative (less than 10) |
| Storage at 10° C., day 5 | $8.4 \times 10^4$ | Negative (less than 10) |
| Storage at 10° C., day 7 | $3.1 \times 10^5$ | Negative (less than 10) |
| Storage at 10° C., day 3 + 30° C. for 24 h | $1.6 \times 10^5$ | Negative (less than 10) |

The inspection method was carried out in accordance with the Standard methods of analysis in food safety regulation (microbiology). The live common bacteria count was measured by a standard agar plate culture method, and E. coli were measured by the BGLG medium method.

Conventional sterilization using hypochlorous acid or ozone eliminates the gelatin of green onions, so that the quality of taste of the green onions is impaired. On the other hand, the quality of taste is excellent when using the processing system of the invention because gelatin of green onions remains after processing.

Example 7

[Examination of Optimal Conditions of System]

Examples 1-6 were carried out using a preferred system of the invention. The preferred system was a system that comprises a heating unit for heating food, a cooling unit for cooling the food that has been heated by the heating unit, and a transporting unit for transporting the food through the heating unit and the cooling unit, wherein steam is ejected downwards from a heating mechanism provided under the transporting unit and convection is generated by a boat-shaped bottom portion (FIG. 3). A meshed conveyor belt was used as the transporting unit. More steam was ejected from a steam ejection port near the feeding entrance of the heating unit compared to a steam ejection port near the exit of the heating unit to quickly raise the temperature of fed food to a temperature of interest. A fan was provided on the top and side portions of the heating unit. Air was blown to proactively generate convection inside the heating unit, whereby the food was constantly in contact with steam with a temperature of interest. A fan was also provided at the cooling unit. Cool air was directly applied to food to quickly cool the food.

A pipe that allows passage of steam was used as a heating mechanism. Food was heated (direct heating) by configuring the system to blow steam released from an ejection hole directly onto the food from the top of the transporting unit. In such a case, food that became soft after losing the fresh mouthfeel was also obtained, compared to the above-described preferred system. The cause thereof is understood to be that it is difficult to control the intermediate temperature zone with direct heating so that the core temperature of the food was raised excessively. Thus, it was revealed that the above-described preferred configuration can achieve uniform processing.

Further, food was processed without operating a fan in the heating unit. In such a case, food that was processed as intended was also obtained, but there was variation in how each food was heated in the heating unit, resulting in the processed food having some variability, from food maintaining fresh mouthfeel to food with insufficient removal of harshness in taste or food that is soft. Thus, it was revealed that the above-described preferred configuration can achieve uniform processing.

Subsequently, food was processed without operating a fan in the cooling unit (e.g., indirect cooling). Compared to cases where a fan was operated for cooling for the same amount of time, the temperature of the food coming out from the cooling unit was not completely lowered in a suitable manner in some cases, such that microbes could have proliferated in subsequent procedures. Thus, considering the sterilization effect, a configuration that proactively cools food with a fan was revealed to be more preferable.

Furthermore, the amount of steam ejected at the steam ejection port near the feeding entrance of the heating unit and the steam ejection port near the exit of the heating unit was held constant in the heating unit. In such a case, food processed as intended was also obtained, while some food took time until reaching a desired temperature and some had harshness in taste removed insufficiently. Thus, it was revealed that the above-described preferred configuration achieves more consistent processing.

Lastly, food processing was attempted after changing a heat mediating substance to micro-mist or clustered air. Compared to using steam, the amount of moisture adhering to the surface of processed food after heating clearly decreased when heated using micro-mist. The amount of moisture decreased further when clustered air was used. Moisture on the food surface is directly linked to risks of microorganism's adherence. Thus, heating using micro-mist or clustered air is clearly advantageous compared to steam.

INDUSTRIAL APPLICABILITY

Processed food with significantly improved taste, preservability, food hygiene, or the like can be produced with the system of the invention. Thus, the system can be utilized in the processed food item industry. The system of the invention is also understood as providing significant contribution to the retail industry or restaurant industry that uses processed food or prepared food items.

The invention claimed is:

1. A production method of a frozen food item, comprising:
(1) processing food with a food processing system; and
(2) freezing the processed food;
wherein the food processing system comprises:
a heating unit comprising a heating mechanism for indirectly heating food;
a cooling unit comprising an air blowing cooler for cooling the food that has been heated by the heating unit; and
a conveyor for transporting the food through the heating unit and the cooling unit;
wherein the heating mechanism is located only below the conveyor and is configured to release a heat mediating substance downwards, and wherein the heating unit comprises an air blowing heater configured to blow air in a direction that is not towards the conveyor.

2. The production method of claim 1, wherein a temperature at a center of the food after cooling by the cooling unit in step (1) is less than 0° C.

3. The production method of claim 1, wherein the heating unit comprises a temperature sensor in the vicinity of the conveyor, and driving of the heating mechanism is controlled by the temperature sensor.

4. The production method of claim 3, wherein the heating mechanism is intermittently driven by the temperature sensor.

5. The production method of claim 3, wherein the conveyor comprises a through hole.

6. The production method of claim 3, wherein the heating unit is configured to heat the food to 45° C. to 90° C.

7. The production method of claim 3, wherein the frozen food item is a frozen cut fruit or a frozen cut vegetable.

* * * * *